(12) United States Patent
Ogasawara

(10) Patent No.: US 6,295,413 B1
(45) Date of Patent: Sep. 25, 2001

(54) DIGITIZING CIRCUIT OF LIGHT AMOUNT RECEIVING FROM STROBE AND CONTROL CIRCUIT OF LIGHT AMOUNT EMITTED FROM STROBE

(75) Inventor: Akira Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/511,071

(22) Filed: Feb. 23, 2000

(30) Foreign Application Priority Data

Feb. 24, 1999 (JP) .................................................. 11-046009
Jun. 25, 1999 (JP) .................................................. 11-180468

(51) Int. Cl.[7] .............................. G03B 15/05; H03K 5/00
(52) U.S. Cl. ........................ 396/155; 327/101; 331/66; 341/157
(58) Field of Search ..................................... 396/159, 160, 396/161, 162, 163; 315/241 P; 327/101; 331/66; 341/157

(56) References Cited

U.S. PATENT DOCUMENTS 4,249,109   2/1981   Ogawa ............................. 396/159 X
4,483,605 * 11/1984   Krumrein ............................. 396/159
5,583,605   12/1996   Sakamoto ............................. 396/159

* cited by examiner

Primary Examiner—W. B. Perkey
(74) Attorney, Agent, or Firm—Oliff & Beridge, PLC

(57) ABSTRACT

A circuit that digitizes a quantity of light received from a strobe according to the present invention, includes: a photoelectric conversion device that receives light from the strobe and generates an output corresponding to an intensity of the received light; a storage device that stores the output generated by the photoelectric conversion device; a constant quantity discharge device that holds a storage quantity at the storage device close to a specific value by discharging a constant storage quantity from the storage device over a specific period which is in synchronization with a specific sampling frequency and is shorter than the sampling cycle when the storage quantity at the storage device exceeds a predetermined threshold value and by implementing feedback control on the storage quantity at the storage device; and a received light quantity output device that outputs one or more pulse signals when the storage quantity at the storage device exceeds the predetermined threshold value.

23 Claims, 24 Drawing Sheets

FIG. 7

| ISO25 | ISO50 | ISO100 | ISO200 | ISO400 | ISO800 | ISO1600 | CONSTANT CURRENT RATIO | 0.5m | 0.7m | 1m | 1.4m | 2m | 2.8m |
|---|---|---|---|---|---|---|---|---|---|---|---|---|---|
|  |  |  | f1.4 | f2 | f2.8 | f4 | 1 |  |  |  |  | 2/625 | 2/312 |
|  |  | f1.4 | f2 | f2.8 | f4 | f5.6 | 1 |  |  |  | 4/1250 | 4/625 | 4/312 |
|  | f1.4 | f2 | f2.8 | f4 | f5.6 | f8 | 1 |  |  | 9/2500 | 9/1250 | 9/625 | 9/312 |
| f1.4 | f2 | f2.8 | f4 | f5.6 | f8 | f11 | 1 |  | 19/5000 | 19/2500 | 19/1250 | 19/625 | 19/312 |
| f2 | f2.8 | f4 | f5.6 | f8 | f11 | f16 | 1 | 39/10000 | 39/5000 | 39/2500 | 39/1250 | 39/625 | 39/312 |
| f2.8 | f4 | f5.6 | f8 | f11 | f16 | f22 | 1 | 78/10000 | 78/5000 | 78/2500 | 78/1250 | 78/625 | 78/312 |
| f4 | f5.6 | f8 | f11 | f16 | f22 | f32 | 1 | 156/10000 | 156/5000 | 156/2500 | 156/1250 | 156/625 | 156/312 |
| f5.6 | f8 | f11 | f16 | f22 | f32 |  | 1 | 312/10000 | 312/5000 | 312/2500 | 312/1250 | 312/625 | 312/312 |
| f8 | f11 | f16 | f22 | f32 |  |  | 1 | 625/10000 | 625/5000 | 625/2500 | 625/1250 | 625/625 |  |
| f11 | f16 | f22 | f32 |  |  |  | 1 | 1250/10000 | 1250/5000 | 1250/2500 | 1250/1250 |  |  |
| f16 | f22 | f32 |  |  |  |  | 1 | 2500/10000 | 2500/5000 | 2500/2500 |  |  |  |
| f22 | f32 |  |  |  |  |  | 1 | 5000/10000 | 5000/5000 |  |  |  |  |
| f32 |  |  |  |  |  |  | 1 | 10000/10000 |  |  |  |  |  |

FIG. 8

CONSTANT CURRENT RATIO

| ISO25 | ISO50 | ISO100 | ISO200 | ISO400 | ISO800 | ISO1600 | | 4m | 5.6m | 8m | 11m | 16m |
|---|---|---|---|---|---|---|---|---|---|---|---|---|
| | | | | | | f4 | 1 | 2/165 | 2/78 | 2/39 | 2/19 | 2/9 |
| | | | | f2 | f2.8 | f5.6 | 1 | 4/165 | 4/78 | 4/39 | 4/19 | 4/9 |
| | f1.4 | f2 | f2.8 | f4 | f5.6 | f8 | 1 | 9/165 | 9/78 | 9/39 | 9/19 | 9/9 |
| f1.4 | f2 | f2.8 | f4 | f5.6 | f8 | f11 | 1 | 19/165 | 19/78 | 19/39 | 19/19 | |
| f2 | f2.8 | f4 | f5.6 | f8 | f11 | f16 | 1 | 39/165 | 39/78 | 39/39 | | |
| f2.8 | f4 | f5.6 | f8 | f11 | f16 | f22 | 1 | 78/165 | 78/78 | | | |
| f4 | f5.6 | f8 | f11 | f16 | f22 | f32 | 1 | 156/165 | | | | |
| f5.6 | f8 | f11 | f16 | f22 | f32 | | | | | | | |
| f8 | f11 | f16 | f22 | f32 | | | | | | | | |
| f11 | f16 | f22 | f32 | | | | | | | | | |
| f16 | f22 | f32 | | | | | | | | | | |
| f22 | f32 | | | | | | | | | | | |
| f32 | | | | | | | | | | | | |

FIG. 11

| ISO25 | ISO50 | ISO100 | ISO200 | ISO400 | ISO800 | ISO1600 | CONSTANT CURRENT RATIO | 0.5m | 0.7m | 1m | 1.4m | 2m | 2.8m |
|---|---|---|---|---|---|---|---|---|---|---|---|---|---|
| | | | | | | f4 | 1/32 | | | | | | 78/10000 |
| | | | | | f2.8 | f5.6 | 1/32 | | | | | 78/20000 | 156/10000 |
| | | | | f2 | f4 | f8 | 1/16 | | | | 156/40000 | 156/20000 | 156/5000 |
| | | | f1.4 | f2.8 | f5.6 | f11 | 1/16 | | | 156/40000 | 156/20000 | 312/10000 | 312/5000 |
| | | f1.4 | f2 | f4 | f8 | f16 | 1/8 | | 312/80000 | 312/40000 | 312/20000 | 312/5000 | 312/2500 |
| | f1.4 | f2 | f2.8 | f5.6 | f11 | f22 | 1/8 | 312/80000 | 312/40000 | 625/20000 | 625/10000 | 625/5000 | 625/2500 |
| f1.4 | f2 | f2.8 | f4 | f8 | f16 | f32 | 1/4 | 625/80000 | 625/40000 | 625/20000 | 625/5000 | 625/2500 | 625/1250 |
| f2 | f2.8 | f4 | f5.6 | f11 | f22 | | 1/4 | 625/40000 | 1250/20000 | 1250/10000 | 1250/5000 | 1250/2500 | 1250/1250 |
| f2.8 | f4 | f5.6 | f8 | f16 | f32 | | 1/2 | 1250/40000 | 1250/20000 | 1250/10000 | 1250/5000 | 1250/2500 | |
| f4 | f5.6 | f8 | f11 | f22 | | | 1/2 | 1250/20000 | 2500/10000 | 2500/5000 | 2500/2500 | | |
| f5.6 | f8 | f11 | f16 | f32 | | | 1 | 2500/20000 | 2500/10000 | 2500/5000 | | | |
| f8 | f11 | f16 | f22 | | | | 1 | 2500/10000 | 2500/5000 | | | | |
| f11 | f16 | f22 | f32 | | | | 1 | 5000/10000 | 5000/5000 | | | | |
| f16 | f22 | f32 | | | | | | 10000/10000 | | | | | |
| f22 | f32 | | | | | | | | | | | | |
| f32 | | | | | | | | | | | | | |

FIG. 12

CONSTANT CURRENT RATIO

| ISO25 | ISO50 | ISO100 | ISO200 | ISO400 | ISO800 | ISO1600 | | 4m | 5.6m | 8m | 11m | 16m |
|---|---|---|---|---|---|---|---|---|---|---|---|---|
| | | | f1.4 | f2 | f2.8 | f4 | 1/32 | 78/5000 | 78/2500 | 78/1250 | 78/625 | 78/312 |
| | | f1.4 | f2 | f2.8 | f4 | f5.6 | 1/32 | 156/5000 | 156/2500 | 156/1250 | 156/625 | 78/312 |
| | f1.4 | f2 | f2.8 | f4 | f5.6 | f8 | 1/16 | 156/2500 | 156/1250 | 156/625 | 156/312 | 156/156 |
| f1.4 | f2 | f2.8 | f4 | f5.6 | f8 | f11 | 1/16 | 312/2500 | 312/1250 | 312/625 | 312/312 | |
| f2 | f2.8 | f4 | f5.6 | f8 | f11 | f16 | 1/8 | 312/1250 | 312/625 | 312/312 | | |
| f2.8 | f4 | f5.6 | f8 | f11 | f16 | f22 | 1/8 | 625/1250 | 625/625 | | | |
| f4 | f5.6 | f8 | f11 | f16 | f22 | f32 | 1/4 | 625/625 | | | | |
| f5.6 | f8 | f11 | f16 | f22 | f32 | | 1/4 | | | | | |
| f8 | f11 | f16 | f22 | f32 | | | 1/2 | | | | | |
| f11 | f16 | f22 | f32 | | | | 1/2 | | | | | |
| f16 | f22 | f32 | | | | | 1 | | | | | |
| f22 | f32 | | | | | | 1 | | | | | |
| f32 | | | | | | | | | | | | |

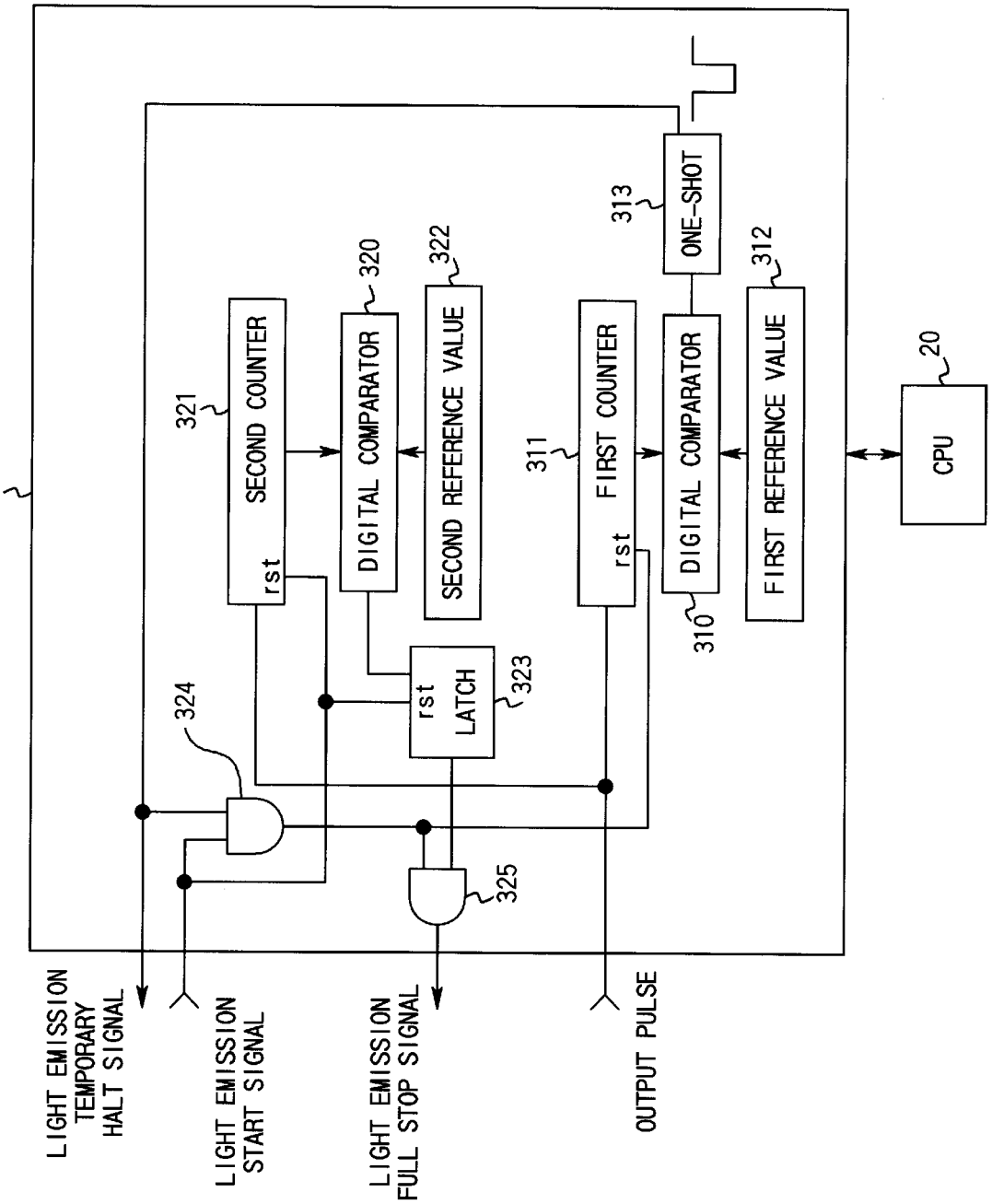

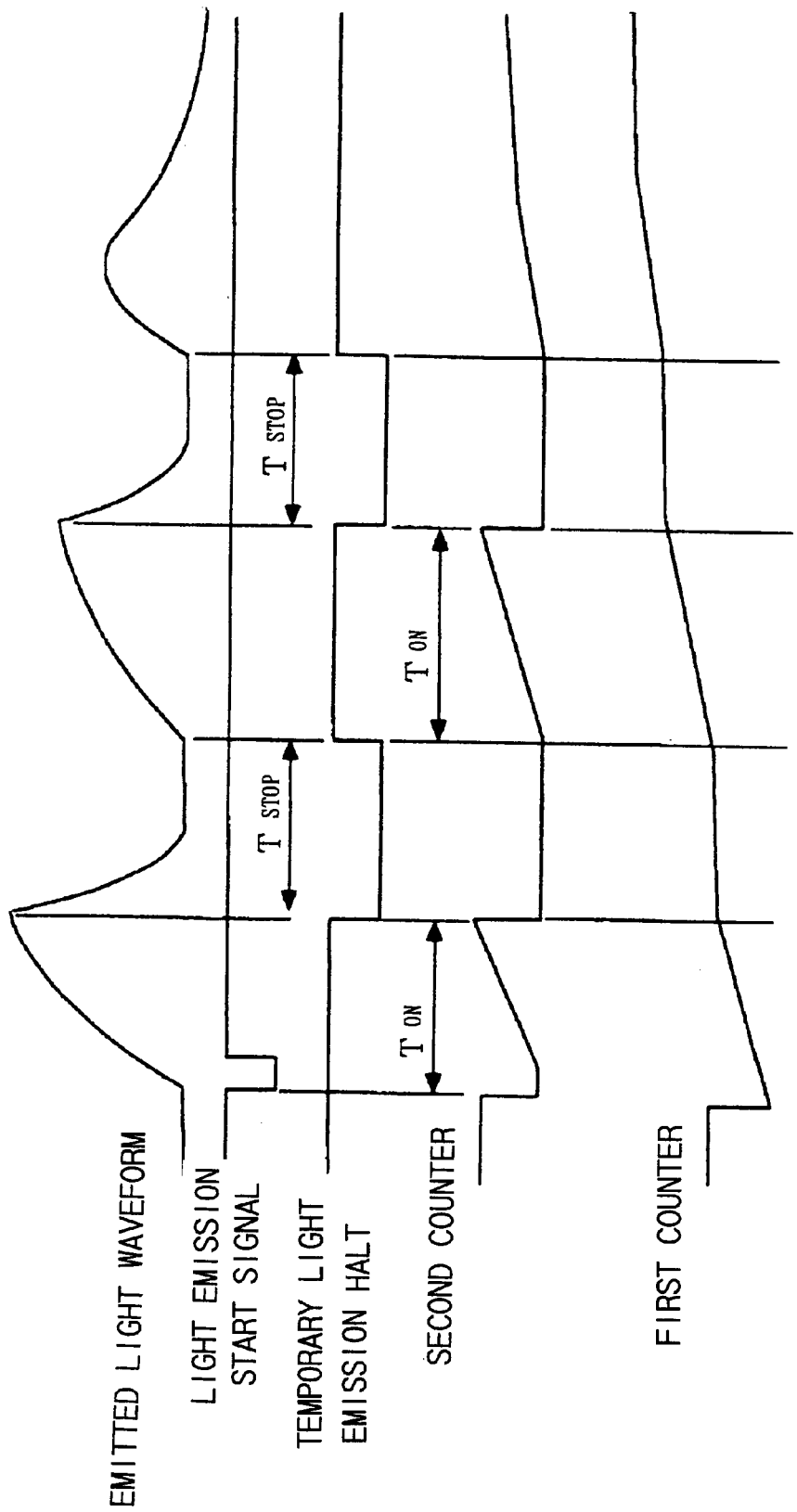

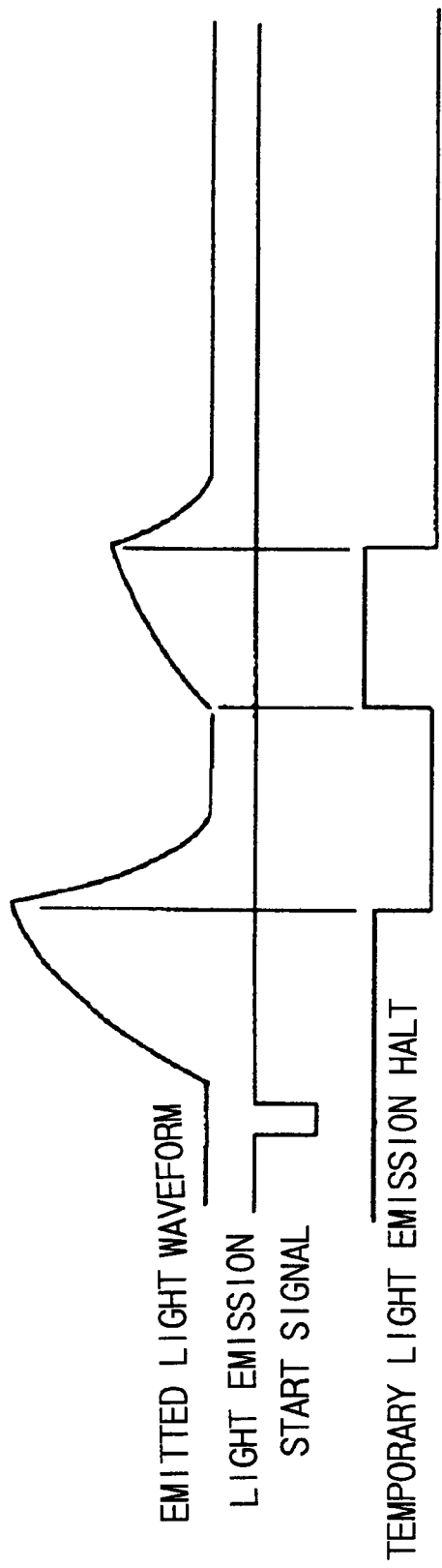

FIG. 23A
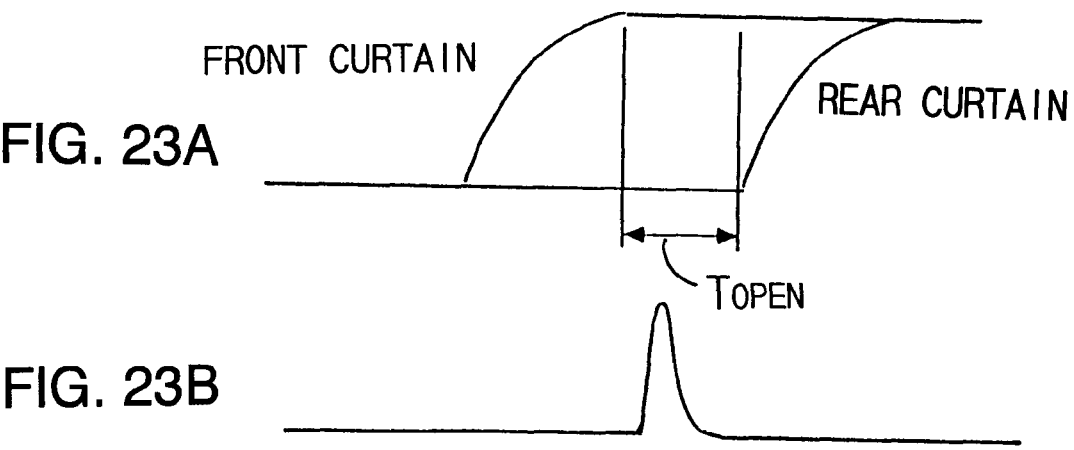
FIG. 23B
FIG. 23C

US 6,295,413 B1

DIGITIZING CIRCUIT OF LIGHT AMOUNT RECEIVING FROM STROBE AND CONTROL CIRCUIT OF LIGHT AMOUNT EMITTED FROM STROBE

INCORPORATION BY REFERENCE

The disclosures on the following priority applications are herein incorporated by reference:

Japanese Patent Application No. 11-046009 filed Feb. 24, 1999

Japanese Patent Application No. 11-180468 filed Jun. 25, 1999

U.S. patent application Ser. No. 09/469272 filed Dec. 22, 1999

BACKGROUND OF THE INVENTION

1. Field of the Invention

The present invention relates to a circuit that digitizes the quantity of light received from a strobe and a circuit that controls the quantity of light emitted by a strobe.

2. Description of the Related Art

Known examples of the prior art technologies include the invention disclosed in U.S. Pat. No. 5,583,605 (Japanese Laid-Open Patent Publication No. H6-308585).

FIG. 26 is a circuit diagram presenting a first example of the prior art technology disclosed in the publication above. In FIG. 26, a photodiode PD1 outputs a photoelectric current that is in proportion to the intensity of light emitted by a strobe (not shown). The photoelectric current output by the photodiode PD1 charges a capacitor C1 and gradually raises the potential at the capacitor C1. The potential of the capacitor C1 is input to a −terminal of a comparator CP1. In addition, resistors R3 and R4 are provided to create a threshold value by dividing a circuit source voltage Vcc, and the threshold value is input to a +terminal of the comparator CP1.

The comparator CP1 outputs High if the potential of the capacitor C1 is lower than the threshold value and outputs Low if the potential is higher than the threshold value. The output of the comparator CP1 is latched (sampled) by a D-type flip flop FF1 over intervals corresponding to the cycle of an oscillation output from an oscillator OSC.

As a result, when the potential at the capacitor C1 is higher than the threshold value, an output Q is set to Low and an inverting output achieved by inverting Q is set to High at the D-type flip flop FF1. Consequently, the inverting output High from the D-type flip flop FF1 is input to a switching element (analog switch) K1 to turn on the switching element K1.

When the switching element K1 is turned on, the charge at the capacitor C1 is discharged via a resistor R2. This lowers the potential of the capacitor C1. However, when the potential becomes lower than the threshold value, the inverting output of the D-type flip flop FF1 achieved by inverting Q is set to Low. As a result, the switching element K1 becomes turned off, thereby stopping the discharge of the capacitor C1.

As is obvious from the explanation given above, the circuit shown in FIG. 26 constitutes a feedback system, in which the potential of the capacitor C1 is controlled to achieve a value close to the threshold value. Thus, the potential of the capacitor C1 is controlled to remain almost constant, thereby setting the discharge current of the capacitor C1 at an almost constant level as well. Consequently, the product of the discharge current value and the length of time of the discharge is almost equal to the quantity of electrical charge achieved per unit time at the photodiode PD1.

An OR circuit OR1 takes an OR of the Q output from the D-type flip flop FF1 and the oscillator output from the oscillator OSC. When the output from the comparator CP1 latched by the D-type flip flop FF1 is at Low, the OR circuit OR1 outputs a negative pulse as its output OUT over a period of time corresponding to half of the oscillation cycle of the oscillator OSC.

The length of time over which the Q output and the inverting output achieved by inverting Q are respectively at Low and High at the D-type flip flop FF1 and the number of times a negative pulse is output at the output OUT at the OR circuit OR1 are in proportion to each other. Consequently, the number of these pulses is almost in proportion to the quantity of electrical charge generated at the photodiode PD1.

FIG. 27 is a circuit diagram presenting a second example of the prior art technology disclosed in Japanese Laid-Open Patent Publication No. H6-308585. The circuit in FIG. 27 is achieved by making the following improvements on the circuit shown in FIG. 26.

Namely, in FIG. 26, Low is output twice by the comparator CP1 both when, for instance, Low from the comparator CP1 (the potential at the capacitor C1 is lower than the threshold value) is sampled by the D-type flip flop FF1 twice in a row and when the level, e.g. Low-High-Low, is sampled discontinuously. Consequently, in these two cases, the quantities of electrical charges discharged from the capacitor C1 are, theoretically, equal to each other. In reality, however, these quantities are not equal to each other in the circuit shown in FIG. 26 due to the transient characteristics manifesting when the switching element (analog switch) K1 is turned on/off. Namely, when Low is output twice in a row, the transient phenomenon manifesting when the switching element is turned on/off occurs only once. However, if the same output level is not sustained, i.e., if Low is output discontinuously as Low-High-Low, the transient phenomenon manifesting when the switching element is turned on/off occurs twice. As a result, the quantity of electrical charge discharged from the capacitor C1 when the same output level is sampled continuously differs from the quantity of electrical charge discharged from the capacitor C1 when different output levels are sampled, due to the difference in the number of times over which the transient phenomenon occurs.

In order to address the problem discussed above, a flip flop FF2, which latches the output from the D-type flip flop FF1 with a delay corresponding to a half cycle is provided in addition to the D-type flip flop FF1 that latches the output from the comparator CP1 in the circuit shown in FIG. 27. Furthermore, a gate OR 2 an a gate NAND 1 are provided to break the period of discharge from the capacitor C1 at every half cycle of the clock. While the gate OR 1 and the gate OR 2 share the same input, the gate OR 1 is provided simply as a dedicated output element for outputting the number of discharges to the outside as pulses.

Thus, even with the switching element K1 on continuously in the circuit shown in FIG. 26, the discharge from the capacitor C1 is alternately achieved through the two resistors R2 and R6 in the circuit shown in FIG. 27.

In the circuit shown in FIG. 27, the degree of the influence of the transient characteristics remains the same whether the discharge from the capacitor C1 is implemented continuously or discontinuously, thereby making it possible to discharge a constant quantity of electrical charge. As a result, the accuracy of the measurement of the quantity of light emitted by the strobe improved.

In addition, the prior art technologies that control light emission by a strobe by generating a digital signal indicating the quantity of received light based upon the quantity of strobe light received by a photosensor include an invention disclosed in U.S. Pat. No. 4,249,109 (Japanese Laid-Open Patent Publication No. S 55-93133 and Japanese Examined Patent Publication No. S59-33842).

In the prior art technology that controls the discharges achieved via the resistors (R2, R6) through the switching element K1 (or through the outputs of the gate OR 2 and the gate NAND 1), the following problems arise.

Firstly, in the discharge from the capacitor (C1) that has stored the photoelectric current from the photodiode (PD1), the discharge period and the quantity of discharged electrical charge are not in accurate proportion to each other due to the influence of the transient characteristics manifesting at the switching element in the discharge circuit. Thus, there is a problem in that the accuracy of the measurement of the quantity of light emitted by the strobe is lowered.

In addition, in the improved circuit shown in FIG. 27, the switching operations at the two discharge circuits (the outputs from the gate OR 2 and the gate NAND 1) may partially overlap, which affects the quantity of discharged electrical charge. Thus, the effect of the transient characteristics at the switching element cannot be completely eliminated in the circuit illustrated in FIG. 27. As a result, there is a problem in that since the discharge period and the quantity of discharged electrical charge are not in accurate proportion to each other, the accuracy of the measurement of the quantity of light emitted by the strobe is compromised.

Secondly, during the process of discharge from the capacitor (C1), in principle, the charge potential at the capacitor (C1) changes. Thus, the hypothesis that a constant current is discharged can be substantiated only in approximation. In particular, if the photoelectric current output by the photodiode (PD1) is large, the potential at the capacitor (C1) fluctuates greatly to result in a lower degree of accuracy in the measurement of the quantity of light emitted by the strobe.

Thirdly, the threshold value of the comparator (CP1) fluctuates in correspondence to fluctuations of the circuit source voltage (Vcc). This results in fluctuations of the discharge current from the capacitor (C1). In addition, since the reverse bias voltage at the photodiode (PD1) fluctuates in correspondence to fluctuations in the circuit source voltage (Vcc), the photoelectric conversion characteristics are affected and the leak current is caused to fluctuate. As a result, a problem arises in that the accuracy of the measurement of the quantity of light emitted by the strobe becomes poor.

Fourthly, the above prior art provides a technology for converting the quantity of light emitted by the strobe to a digital value in real time as the number of pulses. However, it does not disclose a specific method of controlling the quantity of light emitted by the strobe (flash control). As a result, there is a problem in that various adjustments that are implemented by an analog circuit are not achieved by a digital circuit. For instance, the flash control that is implemented to stop a strobe light emission in progress is not realized through the digital circuit.

SUMMARY OF THE INVENTION

A first object of the present invention is to provide a circuit that digitizes the quantity of light received from a strobe without allowing a switching operation performed at a means for constant quantity discharge to lower the accuracy of the measurement of the quantity of light emitted by the strobe when a constant storage quantity is discharged from a means for storage that stores an output of a means for photoelectric conversion such as a photodiode.

A second object of the present invention is to provide a circuit that digitizes the quantity of light received from a strobe and a circuit that controls the quantity of light emitted by a strobe that do not allow a switching operation performed at a discharge circuit to lower the accuracy of the measurement of the quantity of light emitted by the strobe when the electrical charge stored in correspondence to the quantity of light emitted by the strobe is discharged.

A third object of the present invention is to provide a circuit that digitizes the quantity of light received from a strobe and a circuit that controls the quantity of light emitted by a strobe that do not allow the accuracy with which the quantity of light emitted by the strobe is measured to deteriorate when the circuit source voltage fluctuates.

A fourth object of the present invention is to provide a circuit that digitizes the quantity of light received from a strobe and a circuit that controls the quantity of light emitted by a strobe that are each constituted as digital circuits to achieve a high degree of accuracy in the flash control implemented to stop a strobe light emission in progress.

In order to attain the above object, the first circuit that digitizes a quantity of light received from a strobe according to the present invention, comprises: a photoelectric conversion device that receives light from the strobe and generates an output corresponding to an intensity of the received light; a storage device that stores the output generated by the photoelectric conversion device; a constant quantity discharge device that holds a storage quantity at the storage device close to a specific value by discharging a constant storage quantity from the storage device over a specific period which is in synchronization with a specific sampling frequency and is shorter than the sampling cycle when the storage quantity at the storage device exceeds a predetermined threshold value and by implementing feedback control on the storage quantity at the storage device; and a received light quantity output device that outputs one or more pulse signals when the storage quantity at the storage device exceeds the predetermined threshold value.

In the first circuit that digitizes a quantity of light received from a strobe, since the constant quantity discharge device always discharges a constant storage quantity in synchronization with the specific sampling frequency over the specific length of time which is shorter than the sampling cycle in the first circuit that digitizes the quantity of light received from a strobe, the discharge period and the storage quantity that is discharged are in accurate proportion to each other. As a result, the accuracy of the measurement of the quantity of light emitted by the strobe, i.e., the accuracy of the measurement of the photoelectric current, is greatly improved.

The second circuit that digitizes a quantity of light received from a strobe according to the present invention, comprises: a photoelectric conversion device that receives light from the strobe and outputs a current corresponding to an intensity of the received light; a current/voltage conversion device that stores the current output by the photoelectric conversion device and converts the current to a voltage value; a constant current discharge device that holds the voltage value output by the current/voltage conversion device close to a specific voltage level by discharging a constant current from the current/voltage conversion device over a specific period which is in synchronization with a specific sampling frequency and is shorter than the sampling cycle when the voltage value output by the current/voltage conversion device exceeds a predetermined threshold value and by implementing feedback control on the voltage output by the current/voltage conversion device; and a received light quantity output device that outputs one or more pulse signals when the voltage value output by the current/voltage conversion device exceeds the predetermined threshold value.

Since the constant current discharge device always discharges a constant current in synchronization with the specific sampling frequency over the specific length of time that is shorter than the sampling cycle in the second circuit that digitizes the quantity of light received from a strobe, the discharge period and the discharge quantity are in exact proportion to each other. Consequently, the accuracy of the measurement of the quantity of light emitted by the strobe, i.e., the accuracy of the measurement of the photoelectric current, is greatly improved. In addition, the number of pulses output by the received light quantity output device accurately represents the quantity of light received from a strobe.

To achieve the third circuit that digitizes a quantity of light received from a strobe according to the present invention, it is preferred that in the second circuit that digitizes a quantity of light received from a strobe, the constant current is discharged from the current/voltage conversion device over a period corresponding to a half cycle of the sampling cycle. With the constant current discharge from the current/voltage conversion device implemented over a sampling half cycle in the circuit that digitizes the quantity of light received from a strobe, the constant current is not discharged continuously from the current/voltage conversion device. As a result, since one discharge is always performed in correspondence to a single transient phenomenon, any error in the constant current discharge occurring due to overlapping transient phenomena is eliminated with a high degree of reliability.

To achieve the fourth circuit that digitizes a quantity of light received from a strobe according to the present invention, it is preferred that in the second circuit that digitizes a quantity of light received from a strobe, the constant current changes in correspondence to a camera aperture value and film sensitivity. Thus, with the constant current changing in correspondence to the aperture value of the camera and the film sensitivity in the circuit that digitizes the quantity of light received from a strobe, the accuracy of the measurement of the quantity of light emitted by the strobe can be adjusted at a correct value in correspondence to the aperture value and the film sensitivity.

To achieve the fifth circuit that digitizes a quantity of light received from a strobe according to the present invention, it is preferred that in the fourth circuit that digitizes a quantity of light received from a strobe, the constant current that changes in correspondence to the camera aperture value and the film sensitivity is selected from a plurality of predetermined current values. As a result, the constant current can be adjusted with ease in the circuit that digitizes the quantity of light received from a strobe in correspondence to the aperture value at the camera and the film sensitivity.

To achieve the sixth circuit that digitizes a quantity of light received from a strobe according to the present invention, it is preferred that in the fifth circuit that digitizes a quantity of light received from a strobe, the plurality of current values are a plurality of current values inherent to manufactured circuits. Since the plurality of current values inherent to the manufactured circuit are used as the plurality of current values, there is no need for any special circuitry contrivances.

To achieve the seventh circuit that digitizes a quantity of light received from a strobe according to the present invention, it is preferred that the second circuit that digitizes a quantity of light received from a strobe, further comprises: a device that stabilizes a reverse bias voltage at the photoelectric conversion device; and a device that ensures that the threshold value is not affected by a source voltage. Consequently, any reduction in the accuracy of the measurement of the quantity of light emitted by the strobe (photoelectric current) and any reduction in the accuracy of flash control on the strobe due to fluctuations of the circuit source voltage can be effectively prevented.

The first circuit that controls a quantity of light emitted by a strobe according to the present invention, comprises: a photoelectric conversion device that receives light from the strobe and outputs a current corresponding to an intensity of the received light; a current/voltage conversion device that stores the current output by the photoelectric conversion device and converts the current to a voltage value; a constant current discharge device that holds the voltage value output by the current/voltage conversion device close to a specific voltage level by discharging a constant current from the current/voltage conversion device over a specific period which is in synchronization with a specific sampling frequency and is shorter than the sampling cycle when the voltage value output by the current/voltage conversion device exceeds a predetermined threshold value and by implementing feedback control on the voltage output by the current/voltage conversion device; a received light quantity output device that outputs one or more pulse signals when the voltage value output by the current/voltage conversion device exceeds the predetermined threshold value; and a strobe light emission stop device that counts the one or more pulse signals and outputs a light emission stop signal to the strobe when the count value exceeds a predetermined reference value.

Since the constant current discharge device always discharges a constant current operates in synchronization with the specific sampling frequency over the specific length of time that is shorter than the sampling cycle in the first circuit that controls the quantity of light emitted by a strobe, the discharge period and the discharge quantity are in exact proportion to each other. As a result, a great improvement is achieved in the accuracy of the measurement of the quantity of light emitted the strobe, i.e., the accuracy of the measurement of the photoelectric current. In addition, the number of pulses output by the received light quantity output device accurately represents the quantity of light received from a strobe. Furthermore, since the strobe light emission stop device counts the number of pulses and outputs a light emission stop signal to the strobe when the count value exceeds the predetermined reference value, a high degree of accuracy is achieved in flash control implemented to halt a strobe light emission in progress.

To achieve the second circuit that controls a quantity of light emitted by a strobe according to the present invention, it is preferred that in the first circuit that controls a quantity of light emitted by a strobe, the reference value is set smaller than a design reference value determined by an aperture value and a photographing distance. Thus, the adverse effect of the error referred to as residual light, in which light emission is sustained even after the light emission stop signal is output can be minimized.

To achieve the third circuit that controls a quantity of light emitted by a strobe according to the present invention, it is preferred that in the second circuit that controls a quantity of light emitted by a strobe, the reference value is set so as to gradually change over time after a light emission by the strobe starts. In the third circuit that controls the quantity of light emitted by a strobe, in which the reference value gradually changes over time after a start of a strobe light emission, the timing with which the light emission stop signal is output can be adjusted. Consequently, the adverse effect of the error referred to as residual light can be minimized.

To achieve the fourth circuit that controls a quantity of light emitted by a strobe according to the present invention, it is preferred that in the first circuit that controls a quantity of light emitted by a strobe, the strobe light emission stop device counts the one or more pulse signals corresponding to a light emission outputting a very small light quantity implemented by the strobe and selects a constant current for a main light emission following the light emission outputting the very small light quantity from a plurality of predetermined current values based upon results of the count. As a result, since the constant current for the main light emission is determined based upon the pulse signal count value obtained through a light emission with a very small light quantity implemented before the main light emission, the adverse effect of the error referred to as residual light can be minimized.

To achieve the fifth circuit that controls a quantity of light emitted by a strobe according to the present invention, it is preferred that in the fourth circuit that controls a quantity of light emitted by a strobe, the plurality of predetermined current values are base 2 exponential values. Since the plurality of current values are base 2 exponential values, circuit integration (IC design) is facilitated and also, it becomes possible to cover the dynamic range.

To achieve the sixth circuit that controls a quantity of light emitted by a strobe according to the present invention, it is preferred that the fourth or fifth circuit that controls a quantity of light emitted by a strobe, further comprises: a memory storage device that stores differences between the plurality of predetermined current values and a plurality of current values realized in actual circuits in a non-volatile memory; and a correction device that corrects the predetermined reference value based upon the differences between the current values stored at the memory. As a result, since the reference value is corrected based upon the difference between the predetermined constant current value and the constant current value achieved in the actual circuit, accurate flash control can be implemented on the strobe.

The seventh circuit that controls a quantity of light emitted by a strobe according to the present invention, comprises: a photoelectric conversion device that receives light from the strobe and outputs a current corresponding to an intensity of the received light; a current/voltage conversion device that stores the current output by the photoelectric conversion device and converts the current to a voltage value; a constant current discharge device that holds the voltage value output by the current/voltage conversion device close to a specific voltage level by discharging a constant current from the current/voltage conversion device when the voltage value output by the current/voltage conversion device exceeds a predetermined threshold value and by implementing feedback control on the voltage output by the current/voltage conversion device; a pulse signal output device that outputs one or more pulse signals when the constant current is discharged from the current/voltage conversion device; and a split light emission execution device that counts the one or more pulse signals, outputs a light emission temporary halt signal for stopping a strobe light emission over a specific length of time and resets a count value when the count value matches a first value and then repeatedly executes and stops strobe light emission.

Since the strobe is made to split the light over a plurality of times in the seventh circuit that controls the quantity of light emitted by a strobe, it becomes possible to minimize the peak value of the quantity of light emitted per emission by the strobe. As a result, the peak value of the photoelectric current output by the photoelectric conversion device can be limited, to make it possible to set the constant current discharged by the current/voltage conversion device to a small value. Thus, the resolution of the measurement of the quantity of light emitted by the strobe can be improved to achieve higher accuracy in the light emission quantity measurement and to achieve extremely accurate light emission quantity control.

To achieve the eighth circuit that controls a quantity of light emitted by a strobe according to the present invention, it is preferred that in the seventh circuit that controls a quantity of light emitted by a strobe, the constant current discharged by the constant current discharge device is set at a very low current level within a range that allows the voltage value output by the current/voltage conversion device to be held close to the specific voltage level. Thus, since the constant current discharged by the constant current discharge device can be set at a very low level, the resolution of the measurement of the quantity of light emitted by the strobe can be improved, to achieve higher accuracy in the light emission quantity measurement and to achieve extremely accurate light emission quantity control.

To achieve the ninth circuit that controls a quantity of light emitted by a strobe according to the present invention, it is preferred that the seventh or eighth circuit that controls a quantity of light emitted by a strobe, further comprises: a light emission stop device that counts the one or more pulse signals and completely stops a strobe light emission when a count value matches a second value larger than the first value. Thus, a circuit that controls the quantity of light emitted by a strobe, which is capable of halting a split light emission by the strobe when the accumulated quantity of light emitted by the strobe that is engaged in repeated split light emissions reaches a specific light emission quantity (corresponds to the second value) is provided. Since the accumulated light emission quantity in this circuit includes the quantity of light resulting from the residual light corresponding to each split light emission, higher accuracy in the light emission quantity measurement is achieved and also extremely accurate light emission quantity control is implemented.

To achieve the tenth circuit that controls a quantity of light emitted by a strobe according to the present invention, it is preferred that in the ninth circuit that controls a quantity of light emitted by a strobe, the first value and a number of repeated light emissions by the strobe are in reverse proportion to each other. Thus, since the first value and the number of repeated light emissions by the strobe have a relationship whereby they are in inverse proportion to each other, the number of repeated light emissions by the strobe can be set at a large value by setting the first value at a small value. For instance, since the number of repeated (split) light emissions at the strobe can be set at a large value, strobe photographing is enabled even when the shutter curtains are never fully opened or the shutter curtains are fully open only for a very short time.

To achieve the eleventh circuit that controls a quantity of light emitted by a strobe according to the present invention, it is preferred that in the ninth circuit that controls a quantity of light emitted by a strobe, the first value is set larger than the second value. Thus, a circuit that controls the quantity of light emitted by a strobe that is set to ensure that split light emissions are not implemented can be provided.

To achieve the twelfth circuit that controls a quantity of light emitted by a strobe according to the present invention, it is preferred that the tenth circuit that controls a quantity of light emitted by a strobe, further comprises: a setting device that estimates a strobe light emission quantity during exposure by performing at least one preliminary light emission on the strobe prior to the exposure and sets the first value, the second value and intervals over which split light emissions are to be performed based upon the estimated strobe light emission quantity. Thus, it becomes possible to set the total light emission quantity at the strobe, the light emission quantity corresponding to one split light emission, the number of split light emissions and the split light emission intervals when executing split light emissions, so that a desired mode of strobe light emission is realized.

A photoelectric current digitizing circuit according to the present invention, comprises: a light-receiving element that generates a photoelectric current corresponding to an intensity of received light; a capacitor connected in series with the light-receiving element, at which an electrical charge is stored by the photoelectric current; a reference source; a comparator that compares a voltage at the capacitor and a voltage at the reference source and outputs a first signal when the stored charge is equal to or greater than a specific quantity; a reference clock generating circuit; a latch circuit that latches an output of the first signal from the comparator in synchronization with the reference lock; a gate circuit that outputs one pulse signal in correspondence to one cycle of the reference clock as a digitized photoelectric current signal while the latch circuit is latching the output of the first signal from the comparator, based upon the reference clock and an output from the latch circuit; and a constant current circuit that discharges the charge at the capacitor at a specific current level and implements one discharge in correspondence to one pulse signal output by the gate circuit.

An electronic flash unit according to the present invention, comprises: a light-emitting device; a light-receiving element that generates a photoelectric current corresponding to an intensity of received light; a capacitor connected in series with the light-receiving element, at which an electrical charge is stored by the photoelectric current; a reference source; a comparator that compares a voltage at the capacitor and a voltage at the reference source and outputs a first signal when the stored charge is equal to or greater than a specific quantity; a reference clock generating circuit that generates a reference clock; a latch circuit that latches an output of the first signal from the comparator in synchronization with the reference clock; a gate circuit that outputs one pulse signal in correspondence to one cycle of the reference clock as a digitized photoelectric current signal while the latch circuit is latching the output of the first signal from the comparator, based upon the reference clock and an output from the latch circuit; a constant current circuit that discharges the charge at the capacitor at a specific current level and implements one discharge in correspondence to one pulse signal output by the gate circuit; a counter that counts the pulse signal; and a control device that controls the light-emitting device to start a light emission and controls the light-emitting device to stop the light emission when the count value at the counter exceeds a specific reference value after the light emission starts at the light-emitting device.

It is preferred that this electronic flash unit is utilized in a photographing operation performed in a camera and further comprises: a constant current value setting device that sets a specific current at the constant current circuit in correspondence to a camera aperture value.

Also, it is preferred that the electronic flash unit further comprises: a split light emission device that repeatedly implements and stops light emission at the light-emitting device during a period elapsing after the control device starts a light emission at the light-emitting device until the control device stops the light emission.

BRIEF DESCRIPTION OF THE DRAWINGS

FIG. 7 illustrates the relationship between the number of stop pulses and the number of full light emission pulses at various ISO values, aperture values and distances;

FIG. 8 illustrates the relationship between the number of stop pulses and the number of full light emission pulses at various ISO values, aperture values and distances;

FIG. 11 illustrates the relationship between the number of stop pulses and the number of full light emission pulses at various ISO values, aperture values, distances and constant current ratios;

FIG. 12 illustrates the relationship between the number of stop pulses and the number of full light emission pulses at various ISO values, aperture values, distances and constant current ratios;

FIG. 20 is a block diagram of a fourth embodiment;

FIG. 21 is a waveform diagram representing an example of split light emissions implemented in the fourth embodiment;

FIG. 22 is a waveform diagram representing a state in which the value at the second counter has reached the second reference value during the second split light emission and the light emission has come to a complete stop while the second split light emission is in progress;

FIGS. 23A–23C are waveform diagrams that schematically illustrate the state of the front curtain/rear curtain runs and the light emission timing at a single lens reflex camera that employs a focal plane shutter;

DESCRIPTION OF THE PREFERRED EMBODIMENTS

The following is an explanation of preferred embodiments of the present invention, given in reference to the attached drawings.

First Embodiment

Figure 25:
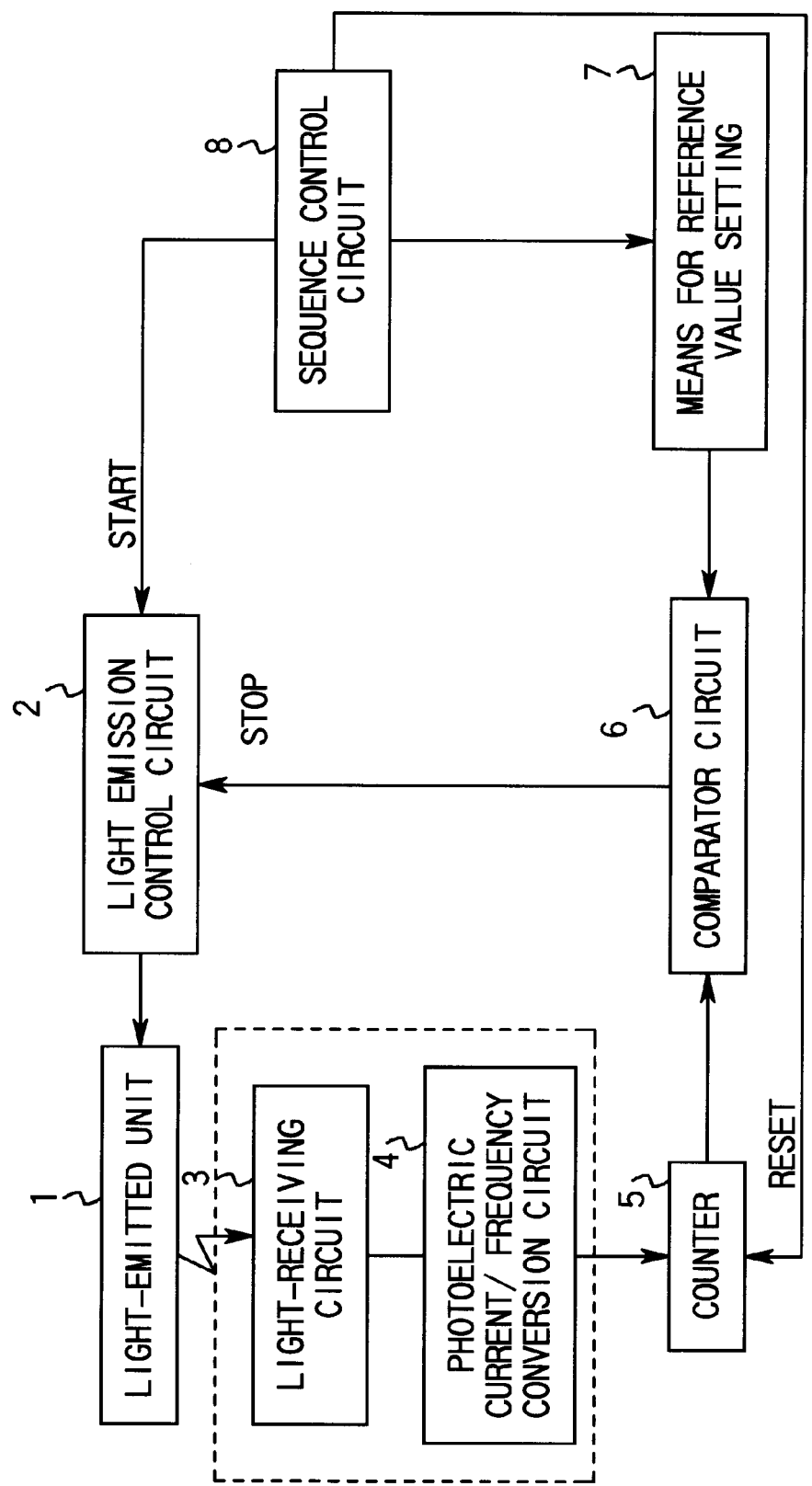
FIG. 25 is a block diagram of a strobe (electronic flash unit) mounted with a circuit that digitizes the quantity of light received from a strobe.

FIG. 25 is a block diagram of a strobe (electronic flash unit) mounted with the circuit that digitizes the quantity of light received from a strobe according to the present invention. The strobe is provided with a light emission unit 1, a light emission control circuit 2, a light-receiving circuit 3, a photoelectric current—frequency conversion circuit 4, a counter 5, a comparator circuit 6 and a means for reference value setting 7. The light-receiving circuit 3 and the photoelectric current—frequency conversion circuit 4 constitute the circuit that digitizes the quantity of light received from a strobe. A photoelectric current output from the light-receiving circuit 3 is converted to a frequency at the photoelectric frequency conversion circuit 4, and its frequency output is counted by the counter 5, the output from the counter 5 and the output from the comparator circuit 6 are compared against each other at the comparator circuit 6 and the results of the comparison are input to the light emission control circuit 2 to stop the light emission To explain the structure shown in FIG. 25 in further detail, the light emission start/stop at the light emission unit 1, which is constituted of an xenon discharge tube, is controlled by the light emission control circuit 2. The light emission control circuit 2 is constituted of a main condenser, a step-up circuit that charges the main condenser, a trigger circuit that starts a flash operation, a switching element employed to stop the flash operation and the like. When a light emission start signal (START) is output from a sequence control circuit 8 to the light emission control circuit 2, a flash operation starts, upon which the light-receiving circuit 3 performs photoelectric current conversion on the flash light from the light emission unit 1 reflected by the subject in the case of external automatic flash control, or similar photoelectric current conversion in the electronic flash unit in the case of manual flash control in which the light quantity is set in advance at the electronic flash unit.

The photoelectric current—frequency conversion circuit 4 generates a frequency that corresponds to the photoelectric current generated at the light-receiving circuit 3 and its output frequency is counted at the counter 5. In other words, the count value at the counter is equal to the value achieved by integrating light quantities. The output from the counter 5 is compared against the output from the means for reference value setting 7 at the comparator circuit 6, and if they match or if the output from the counter 5 is larger, the comparator circuit 6 outputs a light emission stop signal (STOP) to the light emission control circuit 2 to end the flash operation. In addition, prior to the flash operation, the sequence control circuit 8 resets (RESET signal) the counter 5, and an output that corresponds to the correct light quantity is input from the means for reference value setting 7 to the comparator circuit 6. It is to be noted that the comparator circuit 6, the means for reference value setting 7, the sequence control circuit 8 and the like may be constituted by using a microprocessor (CPU).

Figure 1:
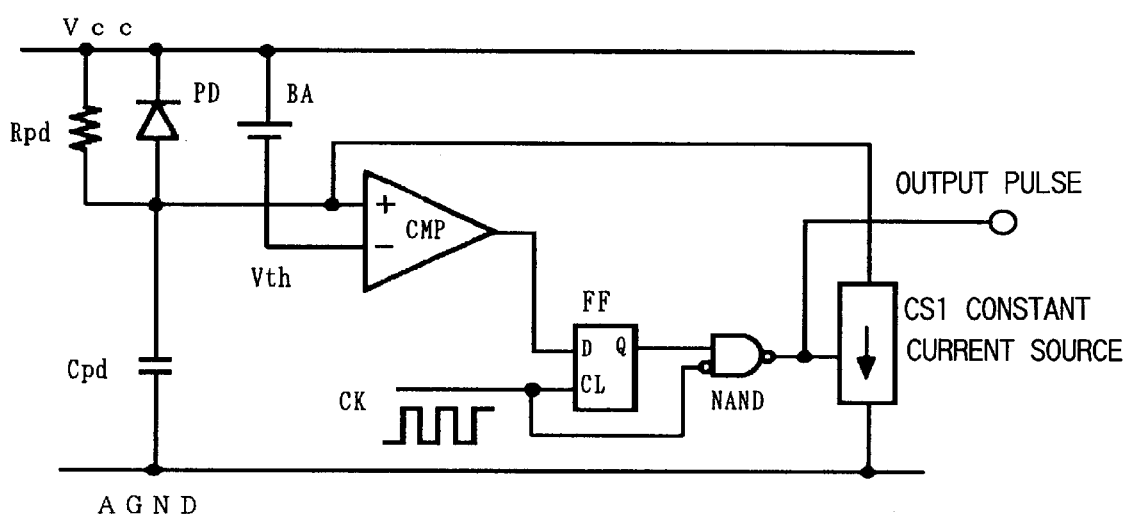
FIG. 1 is a circuit diagram of the circuit that digitizes the quantity of light received from a strobe in a first embodiment of the present invention.

FIG. 1 is a circuit diagram of the circuit that digitizes the quantity of light received from a strobe in the first embodiment. In the circuit that digitizes the quantity of light received from a strobe in FIG. 1, Vcc indicates a circuit source voltage, PD indicates a photodiode for strobe light detection, Rpd indicates a resistor for photodiode PD latch prevention, Cpd indicates a capacitor that converts the charge generated at the photodiode PD to a voltage, CMP indicates a comparator, BA indicates a source that outputs a bias voltage Vth applied to the-terminal of the comparator CMP, FF indicates a D-type flip flop, NAND indicates a NAND circuit and CS1 indicates a constant current source.

The comparator CMP in the circuit outputs High if the potential at the capacitor Cpd is higher than (Vcc−Vth) and outputs Low if the potential is lower than (Vcc−Vth).

In addition, the D-type flip flop FF samples an output from the comparator CMP at a rise of a sample clock CK. The NAND circuit NAND takes NAND of the output from the D-type flip flop FF and an inverted input of the sample clock CK.

More specifically, the D-type flip flop FF latches every output from the comparator CMP at a rise of the sample clock CK. If the output from the comparator CMP is at High the D-type flip flop FF latches High at the rise of the sample clock CK and outputs High as a Q output. Next, during a Low period of time after the fall of the sample clock CK, the NAND circuit NAND outputs Low only if the Q output from the D-type flip flop FF is at High.

In other words, over the half cycle period during which the sample clock CK is at Low, the output from the NAND circuit NAND indicates Low if the output from the comparator CMP that has been sampled immediately before is High. If the conditions described above are not met, the NAND circuit NAND holds the output High at all times.

When the output from the NAND circuit NAND is Low, the constant current source CS1 enters an active state. When the constant current source CS1 is in an active state, a constant electrical charge is discharged from the capacitor Cpd.

In the structure described above, the photodiode PD may be designated as a photoelectric conversion device. The capacitor Cpd may be designated as a storage device or a current/voltage conversion device. The comparator CMP, the D-type flip flop FF and the constant current source CS1 may be designated as a constant quantity discharge device or a constant current discharge device. The D-type flip flop FF and the NAND circuit NAND may be designated as a received light quantity output device.

Figure 26:
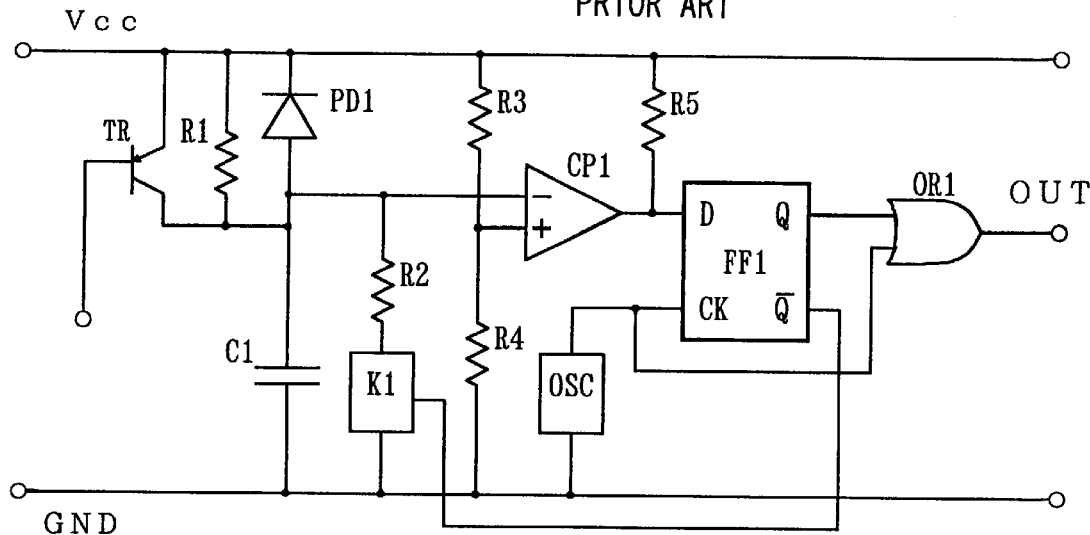
FIG. 26 is a circuit diagram of a first example of the prior art.

Next, the circuit operation achieved in the first embodiment shown in FIG. 1 is explained in specific terms. In the circuit shown in FIG. 1, the photoelectric current generated at the photodiode PD charges the capacitor Cpd. When the potential at the capacitor Cpd exceeds (Vcc−Vth) as a result of the charge, the output from the comparator CMP shifts to High. The output High of the comparator CMP is latched by the D-type flip flop FF at a rise of the sample clock CK, and the constant current source CS1 enters an active state during the next half cycle period in which the sample clock CK is at Low. Thus, the capacitor Cpd discharges a constant quantity of electrical charge during this period resulting in the potential at the capacitor Cpd becoming lower by the quantity corresponding to the discharged electrical charge. As a result, by repeating the operation described above, the potential at the capacitor Cpd is automatically held at the (Vcc−Vth) level. In other words, the circuit in the first embodiment shown in FIG. 1 constitutes a feedback circuit similar to that in the prior art illustrated in FIG. 26.

Figure 2:
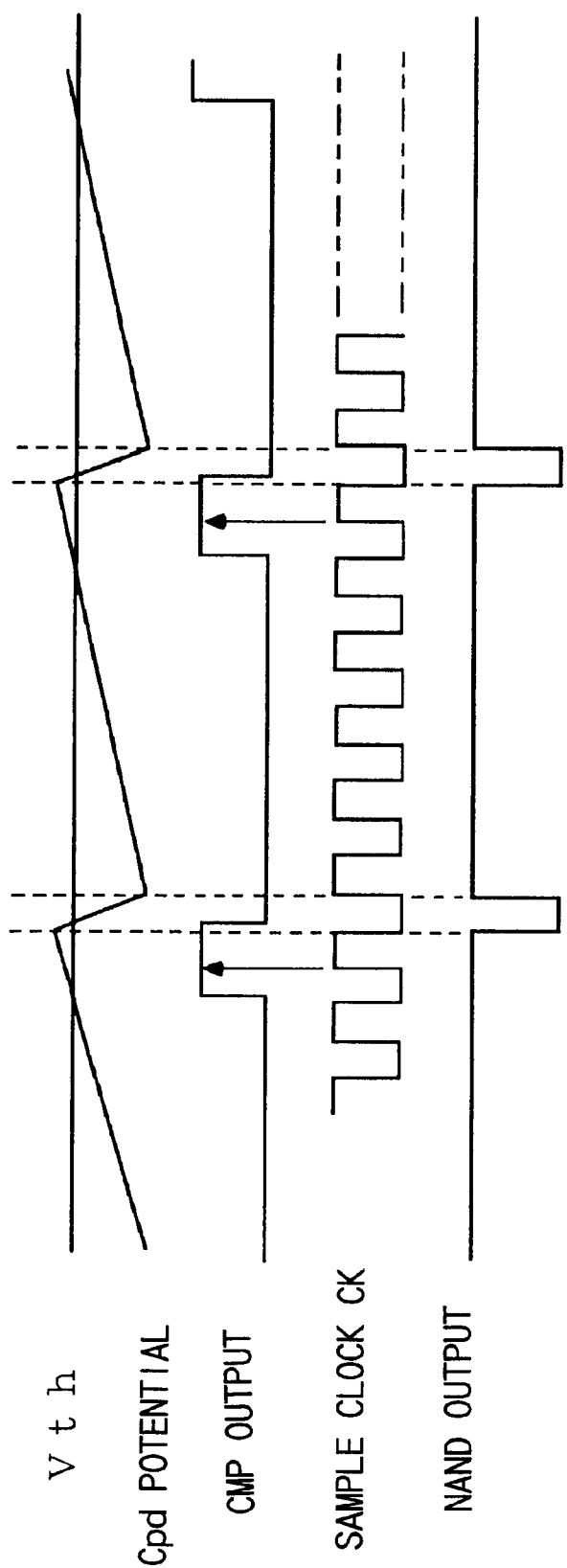
FIG. 2 is a time chart of the operation achieved in the first embodiment shown in FIG. 1.

FIG. 2 is a time chart representing an example of the operation achieved in the first embodiment in FIG. 1, illustrating the circuit operation performed when a constant photoelectric current is output from the photodiode PD. In FIG. 2, the bias voltage Vth, the potential at the capacitor Cpd, the output from the comparator CMP, the sample clock CK and the output from the NAND circuit NAND are shown. As illustrated in FIG. 2, the output of the comparator CMP is detected at a rise of the sample clock CK. The results of the detection manifest in the output from the NAND circuit NAND at the next fall of the sample clock CK. Consequently, there is a delay corresponding to at least a ½ cycle of the sample clock CK and at most one full cycle of the sample clock occurring before the inverted output of the comparator CMP is fed back to the on/off control of the constant current.

In the circuit shown in FIG. 1, the electrical charge stored at the capacitor Cpd is discharged through the function of the NAND circuit NAND only while the sample clock CK is at Low. In other words, the constant current discharge is implemented only during the period corresponding to the half cycle of the sample clock CK, and is not implemented continuously. In addition, since the circuit operation to achieve a single constant current discharge never varies, it is possible to maintain the proportional relationship between the number of discharges and the quantity of discharged electrical charge even when the discharge waveform becomes electrically distorted.

Figure 27:
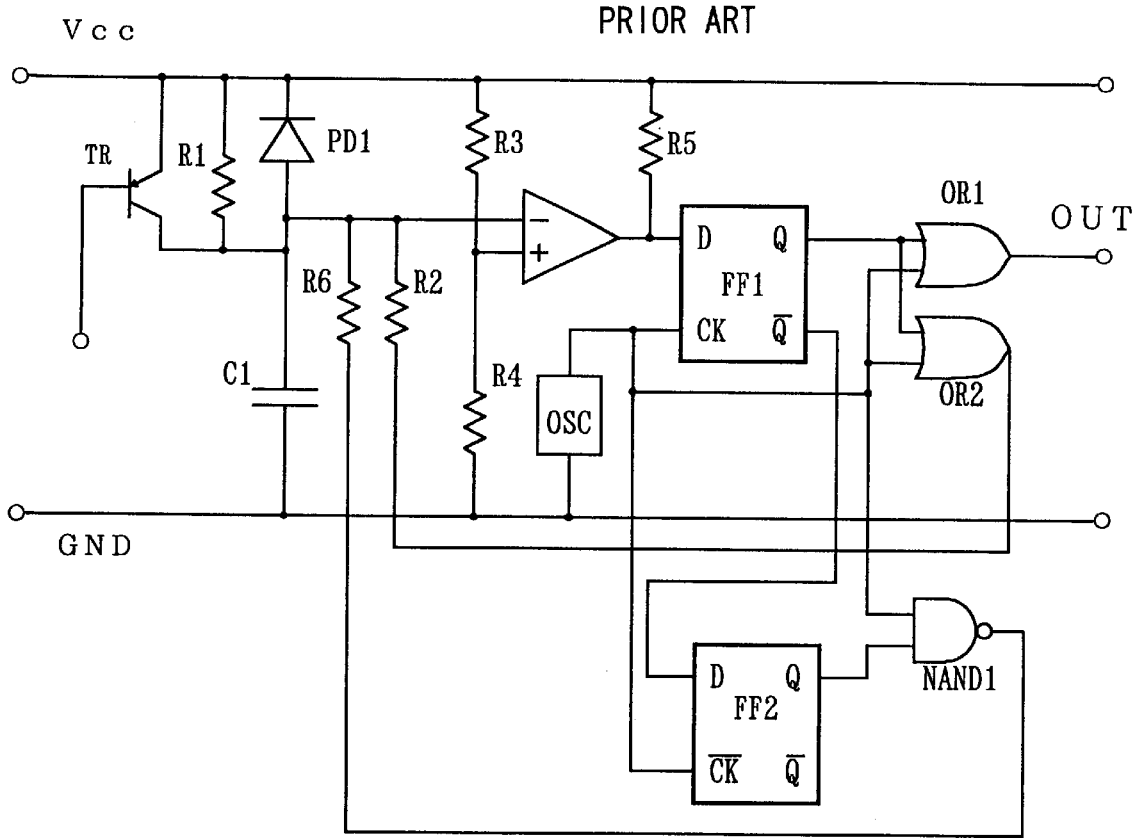
FIG. 27 is a circuit diagram of a second example of the prior art.

As a result, it is not necessary to provide complex circuits (FF1, FF2 and the like) for implementing separate discharges during individual half cycles as shown in FIG. 27 that illustrates the prior art.

In addition, the quantity of discharge per pulse output by the NAND circuit NAND can be set through an adjustment performed on the constant current source CS1. Furthermore, the discharge quantity per pulse, which is measured in advance and read out from a non-volatile memory (not shown) where it is stored, may be used as the constant current discharge value.

The first embodiment shown in FIG. 1 is achieved by ensuring that even if the circuit source voltage Vcc fluctuates, the circuit operation remains stable. In more specific terms, the voltage applied to the photodiode PD is stabilized with Vth and a constant current which is not affected by the circuit source voltage Vcc is used for discharging the capacitor Cpd. In other words, since feedback control is implemented in the circuit so as to equalize the +terminal voltage and the −terminal voltage at the comparator CMP, the voltage on the anode side of the photodiode PD is stabilized at Vcc−Vth. Thus, in the circuit illustrated in FIG. 1, the same number of pulses is output by the N AND circuit NAND in correspondence to varying circuit source voltages Vcc as long as the level of the photoelectric current output by the photodiode PD remains constant. It goes without saying that in a circuit constituted of actual electrical elements, the constant current at the constant current circuit is more or less affected by Vcc. However, the degree of stability is greatly improved compared to the examples of the prior art illustrated in FIGS. 26 and 27.

It is to be noted that the actual strobe light emission is a short flash operation performed over several hundred μs. In order for the circuit shown in FIG. 1 to convert the flash light to pulses in real time, the frequency of the sample clock CK must be raised and the response of the circuit must match the frequency. In the strobe flash control, the number of pulses is counted and compared against the threshold value, and a light emission stop signal is output. Consequently, the resolution of the sample clock CK determines the accuracy of the timing with which the light emission stop signal is generated. In reality, the appropriate range of frequency for the sample clock CK is 4~8 MHz. A resolution of 250 ns is achieved at 4 mHz whereas a resolution of 125 ns is achieved at 8 MHz.

It is to be noted that theoretically, it is possible to improve the accuracy by further raising the frequency. However, it is difficult to create a circuit that can switch the constant current at extremely high speed while stabilizing the accumulated electrical charge quantity.

In addition, it is desirable to achieve the input at the comparator CMP through a MOS transistor input that allows the bias current to be disregarded. However, in order to achieve the high-speed response discussed above, the input at the comparator CMP is normally constituted as a bipolar transistor input. For instance, if a PNP transistor input is performed at the input stage of the comparator CMP, a measurement error occurs due to the bias current at the input terminal added onto the current from the photodiode. The input bias current, the level of which is normally approximately equal to the level of the photoelectric current, charges the capacitor Cpd. This sometimes causes the comparator CMP to invert to High and the NAND circuit NAND to output pulses. Consequently, even when there is no photoelectric current in a dark state, an error attributable to the input bias current occurs. As standard measures taken with respect to this error, the comparator CMP is designed so as to minimize the bias current while assuring a sufficient degree of response during the circuit design stage or a comparator CMP with a small bias current is selected from commercially available comparators. The method of correcting the error is to be detailed later.

Second Embodiment

Figure 3:
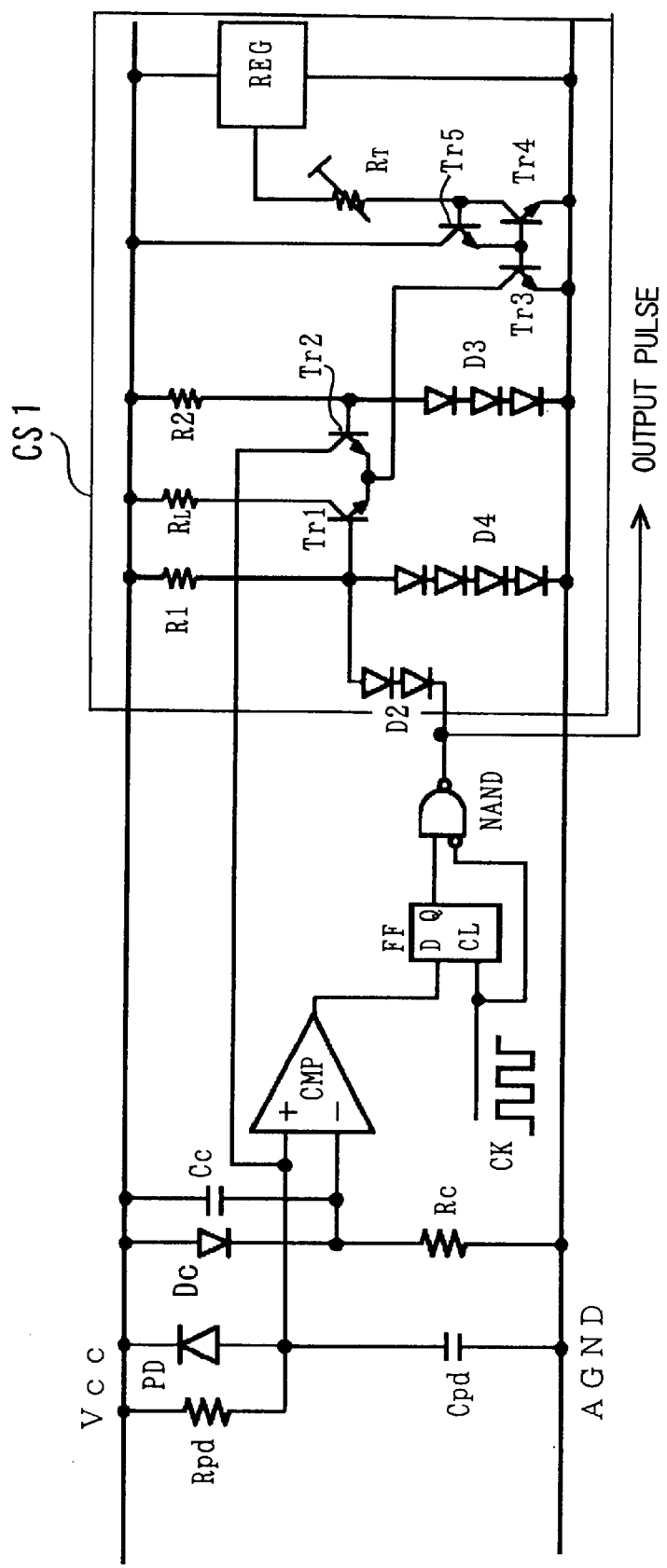
FIG. 3 is a circuit diagram of the circuit that digitizes the quantity of light received from a strobe in a second embodiment of the present invention.

FIG. 3 is a circuit diagram illustrating the second embodiment of the present invention. FIG. 3 is achieved by adding specific details to the circuit in FIG. 1 to facilitate integration of the circuit in FIG. 1. The operation of the constant current source CS1 in FIG. 3 is now explained. In FIG. 3, the same reference numbers are assigned to components identical to those in FIG. 1. In addition, in FIG. 3, R1, R2 and RL each indicate a resistor, REG indicates a constant voltage circuit, RT indicates a variable resistor, Tr1, Tr2, Tr3, Tr4 and Tr5 each indicate a transistor, D2 indicates two diodes that are connected in series, D3 indicates three diodes that are connected in series and D4 indicates four diodes that are connected in series.

The constant voltage circuit REG, the transistors Tr1, Tr2, Tr3, Tr4 and Tr5, the diodes D2, D3, D4 and the like constitute the constant current source CS1 in FIG. 1. To explain this point in further detail, the constant voltage circuit REG and the transistors Tr3, Tr4 and Tr5 constitute a constant current circuit, with a constant current flowing between the collector and the emitter of the transistor Tr3. In addition, in the following explanation, VF represents a voltage drop occurring at one diode. The output of the NAND circuit NAND constitutes an open drain.

In the structure described above, the photodiode PD may be designated as a photoelectric conversion device. The capacitor Cpd may be designated as a storage device or a current/voltage conversion device. The comparator CMP, the D-type flip flop FF and the constant current source CS1 constituted of the individual elements explained above may be designated as a constant quantity discharge device or a constant current discharge device. The D-type flip flop FF and the NAND circuit NAND may be designated as a received light quantity output device.

When the output from the NAND circuit NAND is at High, the base potential at the transistor Tr1 is four times the voltage drop VF due to the presence of the diode D4. The base potential at the transistor Tr, on the other hand, is three times the voltage drop VF due to the presence of the diode D3. Thus, the entire constant current output flowing between the collector and the emitter at the transistor Tr3 also flows through the transistor Tr1. Consequently, when the output from the NAND circuit NAND is at High, no discharge from the capacitor Cpd occurs.

In contrast, when the capacitor Cpd is charged with the photoelectric current and the output from the comparator CMP shifts to High, the NAND circuit NAND outputs Low over the half cycle period, during which the sample clock CK is at Low, as explained earlier. As a result, the base potential at the transistor Tr1 falls down to the level which is approximately twice the voltage drop VF due to the presence of the diode D2. Consequently, the constant current output flowing between the collector and the emitter at the transistor Tr3 flows through the transistor Tr2 instead of the transistor Tr1. The current flowing through the transistor Tr2 extracts the charge stored at the capacitor Cpd. As this sets the output from the comparator CMP to Low again, the NAND circuit NAND outputs High to turn on the transistor Tr1 and turn off the transistor Tr2, thereby stopping the extraction of the constant current from the capacitor Cpd.

The circuit illustrated in FIG. 3 achieves the following advantages over a circuit structure in which simple on/off control is implemented on the transistors to extract the constant current from the constant voltage circuit.

Namely, an extremely long delay in response and an extremely large degree of transient distortion occur in the structure in which the constant current is extracted from the constant voltage circuit through the simple on/off control implemented on the transistors. In contrast, the circuit shown in FIG. 3 achieves high speed response by applying the principle of a differential circuit in the constant current source CS1 in FIG. 1. In addition, the circuit shown in FIG. 3 demonstrates relatively good characteristics with respect to the transient distortion.

Furthermore, in the circuit in FIG. 3, the bias voltage Vth in FIG. 1 is provided by a diode Dc, a resistor Rc and a capacitor Cc. Since the reverse bias potential at the diode Dc is stable, the bias voltage Vth is stabilized regardless of the level of the circuit source voltage Vcc. The stability of the reverse bias potential at the diode Dc is attributable to the fact that the forward voltage at the diode Dc remains unchanged even when the current fluctuates to some degree. In other words, the diode Dc is utilized as a practical and inexpensive constant voltage element in place of a battery. In addition, as explained earlier, the constant current, which remains unaffected by the circuit source voltage Vcc is utilized for the discharge from the capacitor Cpd. As a result, the circuit operation is stable in the circuit shown in FIG. 3 even when the circuit source voltage Vcc fluctuates, as in the circuit shown in FIG. 1.

Next, the adjustment of the constant current value, the measurement accuracy and the constant current switching are explained.

The circuit in FIG. 3 may be provided either on the strobe side or on the camera side. The following explanation is given on the assumption that the circuit in FIG. 3 is provided on the strobe side. In this case the photodiode PD for photometering always receives the light reflected from the subject at the same aperture setting.

Figure 4:
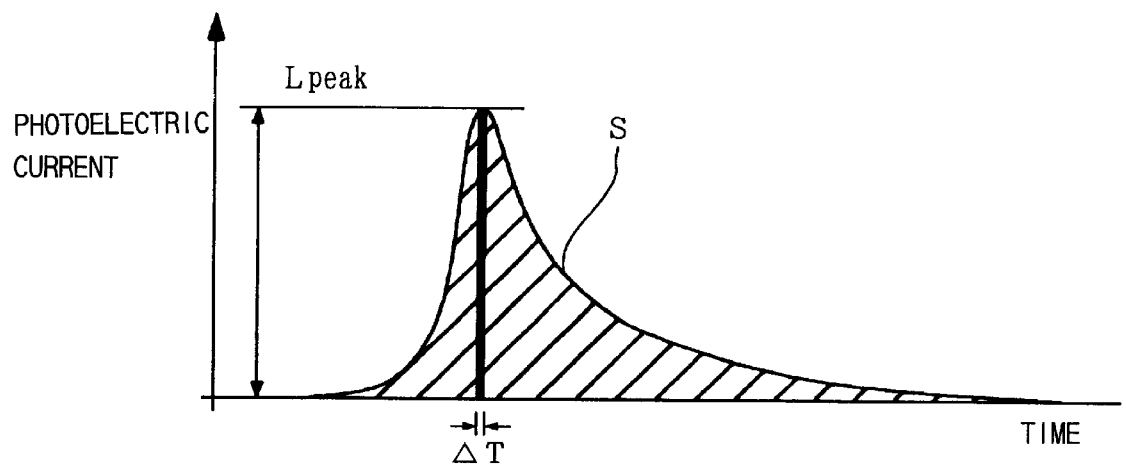
FIG. 4 presents a full light emission waveform achieved by a standard strobe.

FIG. 4 is a diagram of the (full) light emission waveform achieved by a standard strobe light that emits light to be received by the photodiode PD shown in FIG. 3. The horizontal axis represents time and the vertical axis represents the photoelectric current. Since the circuit is provided on the strobe side, it remains unaffected by the lens aperture setting. The reflected light becomes more intense as the distance to the subject becomes smaller, and it becomes less intense as the distance to the subject increases. In principle, the photoelectric current increases and decreases in inverse proportion to the square of the subject distance. The waveform of the photoelectric current shown in FIG. 4 achieves a similar figure regardless of the distance to the subject.

When the strobe light achieving a waveform as shown in FIG. 4 is measured by employing the circuit shown in FIG. 3, it is necessary to determine the value of the constant current for extraction by ensuring that the potential at the capacitor Cpd is maintained at Vth even when the value of the photoelectric current at the photodiode PD is at its peak.

Since the constant current is discharged only over the half cycle period of the sample clock CK in the circuit shown in FIG. 3, it is necessary to set the constant current value to a value at least twice the peak value of the photoelectric current. Thus, the constant current needs to be set at a value at least twice the peak value of the photoelectric current at the minimum control distance.

When S represents the area of the emitted light waveform (full received light quantity), Lpeak represents the peak current and $\Delta T$ represents the sampling cycle ($\Delta T = 1/CK$) in FIG. 4 and the constant current in FIG. 3 is set to 2×Lpeak, the total number of pulses N is expressed as;

$$N = S/((2 \times Lpeak) \cdot (\Delta T/2)) \quad (1)$$
$$= S/(Lpeak \cdot \Delta T)$$

Formula (1) indicates that a given total received light quantity S can be converted to more number of pulses N by reducing Lpeak·$\Delta T$. $\Delta T$ is reduced by raising the sampling frequency, and Lpeak can be reduced by lowering the peak current.

Figure 5:
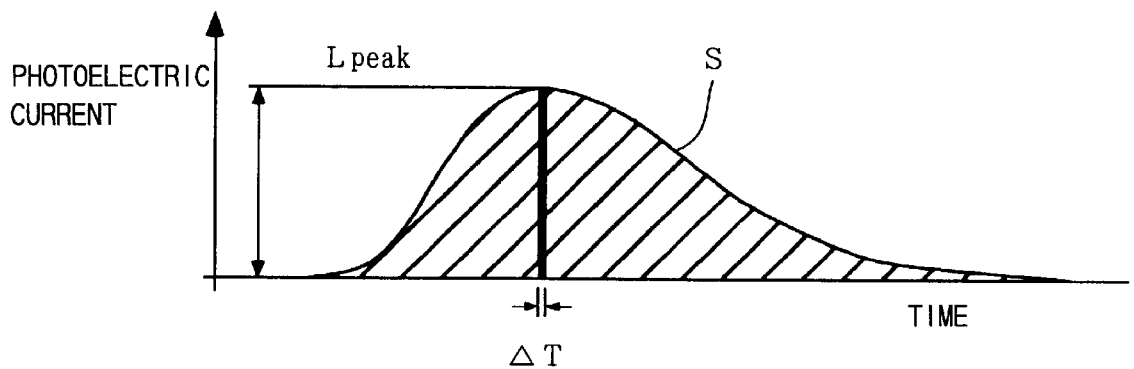
FIG. 5 presents a light emission waveform achieved by lowering the peak current.

FIG. 5, which is provided for purposes of comparison with the example shown in FIG. 4, presents an emitted light waveform achieved when the distance is set at the constant value, the total received light quantity S is at a constant value and the peak current is reduced. The emitted light waveform in FIG. 5 is flatter.

By flattening the emitted light waveform in this manner, an improvement whereby control is facilitated in the analog systems in the prior art as well as in the circuit that digitizes the quantity of light received from a strobe in this embodiment is achieved. However, if the emitted light waveform is flattened to convert a given total received light quantity S to more number of pulses N, the inductance which is inserted in series into the light-emitting circuit increases. Thus, it is necessary to find a certain compromise point in practical use by taking into account the size and the current capacity of the inductor in use.

In addition, assuming that the constant current is drawn out over the period corresponding to a half sampling cycle, the constant current value must be set at least twice the peak value Lpeak of the photoelectric current. Thus, any delay in the circuit occurring due to a cause other than sampling can be prevented and, in addition, the detection capability can be maximized.

As explained earlier, the constant current value must be at least twice the peak value Lpeak of the photoelectric current in the circuits shown in FIGS. 1 and 3. However, as the constant current value increases, the negative pulses output by the NAND circuit NAND become more sparse due to a greater delay occurring in the detection attributable to the lowered resolution of the detection of the flash light emitted by the strobe in the circuits in FIGS. 1 and 3. Namely, when the constant current is set to a larger value, the discharge current also increases. Thus, the potential at the capacitor Cpd is caused to fall greatly through a single discharge and a considerable length of time elapses before the potential at the capacitor Cpd, which is charged with the next photoelectric current, exceeds Vth, with the result that a considerable length of time elapses before the next pulse is output. Consequently, the constant current cannot be set to an extremely large value. In practical application, the constant current value is determined as follows by taking into consideration the optimal operation of the circuit and the circuit adjustment margin. Namely, the constant current should be adjusted to a value which is approximately three times the photoelectric current peak value Lpeak measured by performing a strobe light emission at the smallest possible photographing distance (normally 0.5 m~0.75 m).

Third Embodiment

Next, the external flash control on the strobe, i.e., the light emission quantity control implemented by the strobe itself, is explained. When the light emission quantity control is implemented on the strobe side, the reflected light from the subject is received at a photodiode of the strobe main unit to generate pulses in correspondence to the quantity of received light. When the number of pulses reaches a specific value, a light emission stop signal is output. The light emission stop signal turns off the flash tube (xenon tube) of the strobe. This is referred to as an "automatic flash control mode." The word "external" as used in this context means an external (strobe-side) flash control circuit which operates independently of the flash control circuit provided in the camera.

Figure 6:
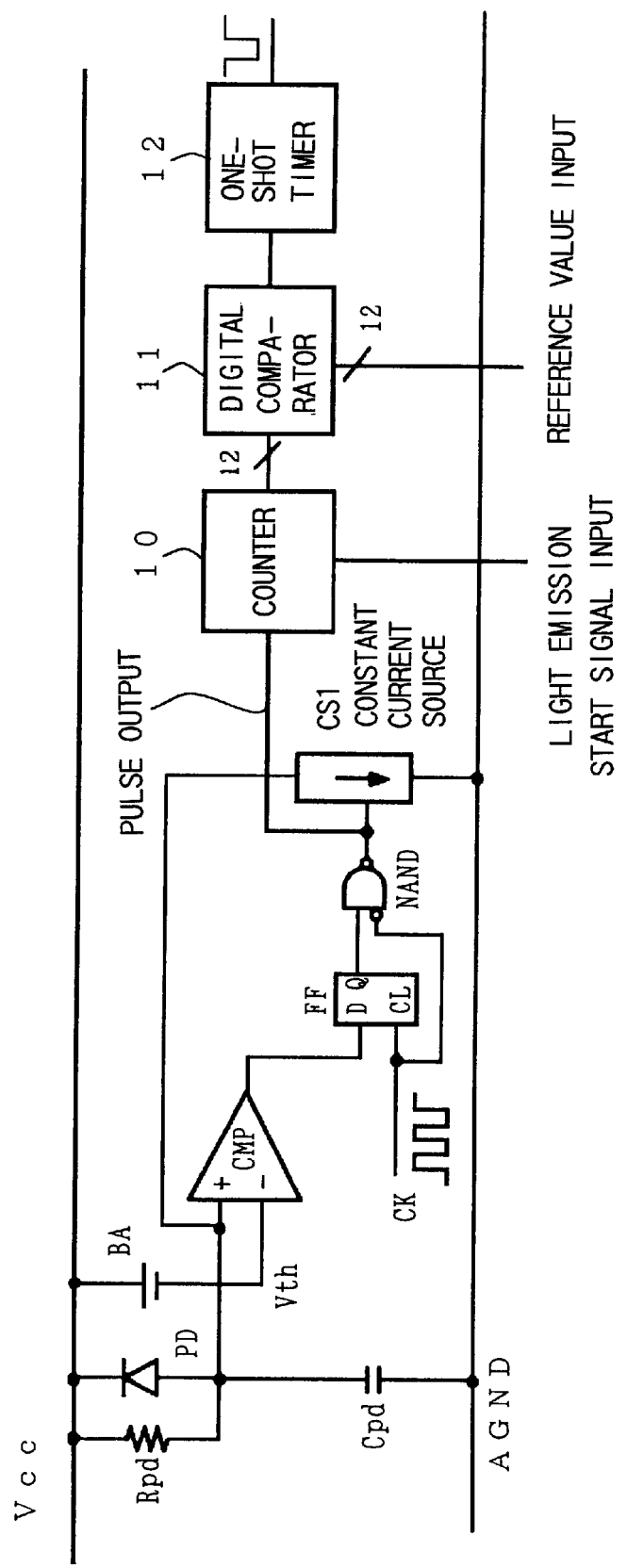
FIG. 6 is a circuit diagram of the circuit that controls the quantity of light emitted by a strobe in a first embodiment that generates a light emission stop signal by employing the circuit that digitizes the quantity of light received from a strobe shown in FIG. 1.

FIG. 6 is a circuit diagram illustrating the third embodiment of the present invention. The embodiment in FIG. 6 provides a circuit that controls the quantity of light emitted by a strobe, which generates a light emission stop signal by employing the circuit that digitizes the quantity of light received from a strobe, shown in FIG. 1.

In FIG. 6, pulses output by the strobe light emission quantity control circuit shown in FIG. 1 are counted at a counter 10, the count value is compared against a reference value (referred to as a stop pulse value) which corresponds to a specific light quantity at a digital comparator 11, and when the count value matches the reference value, a light emission stop signal is output from a one-shot timer 12 provided at a rear stage. The counter 10 shown in FIG. 6 is cleared in response to a light emission start signal output from the camera side. The light emission stop signal is a short signal sustained only over several $\mu$sec. In addition, the counter 10 counts up the quantity of light emitted by the strobe from 0 after it is cleared in response to the light emission start signal. Since various circuit technologies that may be adopted to stop strobe light emission have been disclosed and various products adopting such technologies have been marketed, these technologies are of the known art and their explanation is omitted here.

It is to be noted that in the structure shown in FIG. 6, the counter 10, the digital comparator 11 and the one-shot timer 12 may be designated as a strobe light emission stop device. Other components may be designated as the same device as in those the first embodiment.

In addition, it is assumed in the following explanation that the minimum photographing distance is at 0.5 m, the constant current is at a value twice the peak value of the photoelectric current and the maximum pulse count value at the counter 10 during a full light emission (hereafter referred to as the full light emission pulse value) is 10,000 pulses. They are realistic numerical values that may be set in combination with the sample clock CK set in the range of 4~8 MHz.

FIGS. 7 and 8 present examples of the stop pulse value and the full light emission pulse value at various aperture values and various distances under the conditions outlined above. The stop pulse value and the full light emission pulse value are expressed together as a fraction. The denominator represents the full light emission pulse value and the numerator represents the stop pulse value.

The full light emission pulse value remains constant as long as the distance is unchanged, and increases/decreases in inverse proportion to the square of the distance.

As FIG. 7 indicates, 10,000 pulses are generated during a full light emission at the distance of 0.5 m. However, as FIG. 8 clearly indicates, the full light emission pulse value becomes reduced down to 78 pulses with the distance set to 5.6 M.

In addition, the optimal exposure quantity in a camera is constant regardless of the distance, as long as the aperture value is the same. As a result, the stop pulse values corresponding to the individual aperture values are constant, as well. Furthermore, from the viewpoint of light quantity control, changing the ISO value (film sensitivity) is synonymous with changing the aperture value. Thus, in FIGS. 7 and 8, various ISO values and aperture values are presented on the left side.

As demonstrated in FIGS. 7 and 8, the stop pulse value can be determined when the ISO value and the aperture value are ascertained. In other words, the stop pulse value is not affected by the photographing distance. The stop pulse value is set as a reference value input to the digital comparator 11 shown in FIG. 6.

The ratio of the stop pulse value to the full light emission pulse value indicates the timing with which a light emission stop signal is output during a strobe light emission. For instance, the ratio of the stop pulse value to the full light emission pulse value is "2500/10,000 at a distance of 0.5 m and an aperture value of f32 with the ISO value at 100," "625/2500 at a distance of 1 m and an aperture value of f16 with the ISO value at 100," "156/625 at a distance of 2 m and an aperture value of f8 with the ISO value at 100" and "39/156 at a distance of 4 m and an aperture value of f4 with the ISO value at 100," as indicated in FIGS. 7 and 8. In other words, the ratio of the stop pulse value to the full light emission pulse value is always ¼ in all cases. Thus, the timing with which the light emission stop signal is output is the same in all these cases.

However, it becomes difficult to implement flash control on the strobe with a high degree of accuracy in the strobe light emission quantity control circuit when the stop pulse value becomes small. The stop pulse value becomes reduced when the number of times the output pulses are generated becomes reduced in the circuit shown in FIG. 1, FIG. 3 or FIG. 6 for example, in which the constant current is set as a fixed value, since the quantity of light received by the light-receiving sensor (photodiode PD) of the strobe light emission quantity control circuit becomes attenuated as the subject is positioned further away (in inverse proportion to the square of the distance).

Figure 9A:
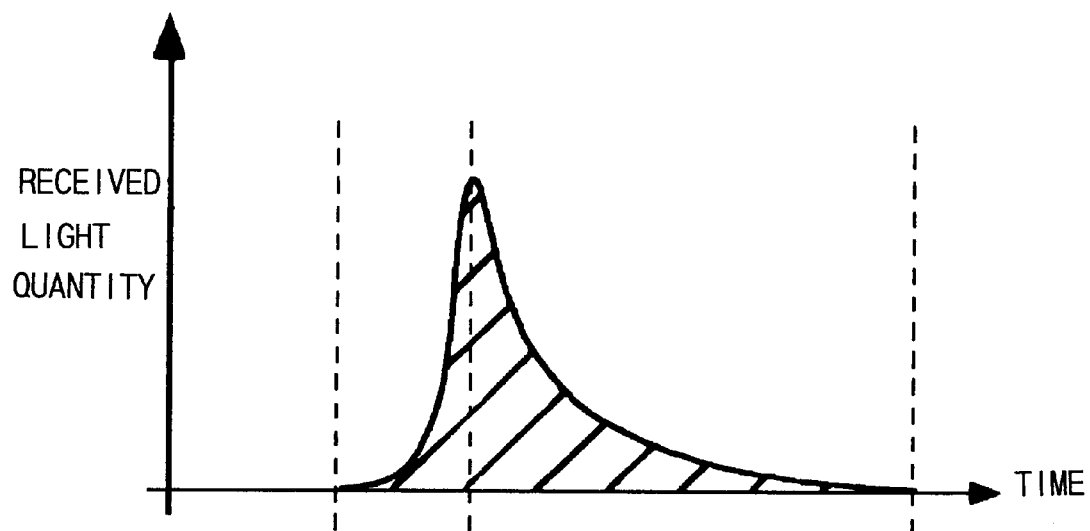
FIGS. 9A and 9B show the quantities of light received at the photodiode PD when strobe light achieving the same light quantity output is irradiated on a subject at short range and a subject at long range.
Figure 9B:
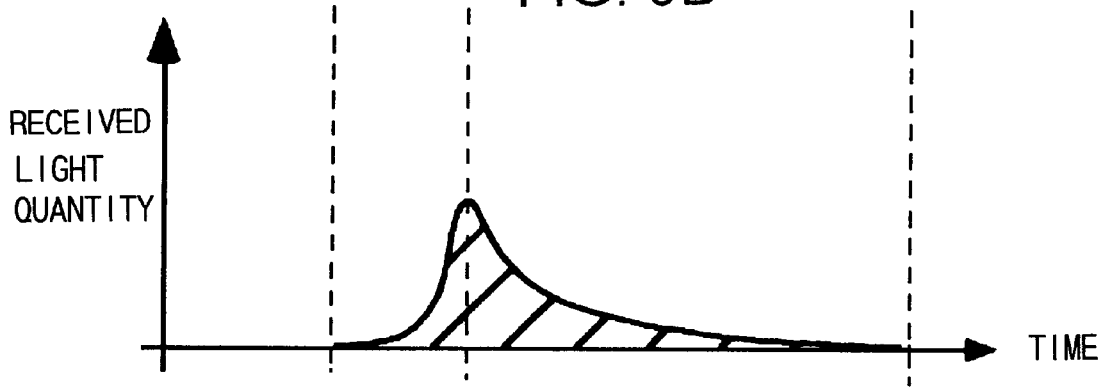

FIGS. 9A and 9B show the quantities of light received at the photodiode PD when a given quantity of strobe light is irradiated on a subject at short range and a subject at long range. FIG. 9A shows the quantity of light received when a subject at short range is irradiated and FIG. 9B shows the quantity of light received when a subject at long range is irradiated.

In the circuits illustrated in FIGS. 1, 3 and 6, the output pulse generations become sparse as the distance increases to result in the degree of measurement accuracy regarding time becoming lowered. In the automatic flash control mode, the control accuracy becomes particularly poor when the distance is large, the aperture value is a bright value and the ISO value is high. For instance, as FIG. 8 clearly indicates, the ratio of the stop pulse value to the full light emission pulse value is 2/156 at an aperture value of f2 and a distance of 4 m with the ISO value at 400. Likewise, as indicated in FIG. 8, the ratio of the stop pulse value to full light emission pulse value is an extremely rough value of 2/78 at an aperture value of f2 and a distance of 5.6 M with the ISO value at 400.

It is to be noted that by ascertaining the full light emission pulse value corresponding to the photographing distance in advance, the constant current in FIGS. 1, 3 and 6 can be set at a small value in proportion to the full light emission pulse value. This makes it possible to achieve consistency in the full light emission pulse value regardless of the photographing distance in the circuits illustrated in FIGS. 1, 3 and 6. If this method can be implemented in practical use, the problem with respect to control accuracy can be eliminated.

However, if the photographing distance can be set at 10 levels from 0.5 m to 16 m, the constant current must range over a multiplication factor of 1024. In reality, it is difficult to operate the circuits illustrated in FIGS. 1, 3 and 6 over such a large current range. In addition, lens distance information transmitted from the camera side is needed to ascertain the photographing distance. However, the distance information may have a large error. Furthermore, the full light emission pulse value varies greatly even at the same photographing distance, depending upon the reflectance of the subject and the state of the background. Thus, it is difficult to improve the control accuracy in the circuits illustrated in FIGS. 1, 3 and 6 by setting the constant current at a small value in proportion to the photographing distance.

In addition, as FIGS. 7 and 8 indicate, the photographing distance at which the stop pulse value is equal to the full light emission pulse value varies in correspondence to individual aperture values. It is to be noted that in FIGS. 7 and 8, the stop pulse value is equal to the full light emission pulse value in the lowest entry for each distance. For instance, when the distance is 0.5 m, 10,000/10,000 and when the distance is 0.7 m, 5,000/5,000. When the aperture value is small and, therefore, the quantity of light reaching the film surface is large, photographing over a long range is naturally enabled. If the aperture value is increased by one level, the range over which the strobe light is effective is reduced to 70.7%, thereby presenting difficulty in photographing over a long distance.

In addition, in FIGS. 7 and 8, the photographing limit for short range varies in correspondence to the individual aperture values. For instance, the photographing limit corresponding to the distance 0.5 m is represented as combinations of ISO values and aperture values, each achieving a ratio of the stop pulse value to the full light emission pulse value of 39/10,000. They include the combination of ISO 100 and the aperture value 4 and the combination of ISO 200 and the aperture value 5.6.

It is to be noted that there is a stop pulse value, at least in calculation, even when the ISO is 100, the distance is 0.5 m and the aperture value is 1.4. However, in this situation, the strobe emits only an extremely small quantity of light, which makes it difficult to implement control. For this reason, the combination of ISO 100, the distance 0.5 m and the aperture value 4 is set as the limit in FIGS. 7 and 8.

In addition, the photographing limit in the short range extends to a point corresponding to the aperture value brighter by one level as the distance increases by one level. While "stop pulse value":"full light emission pulse value" =39:10,000 is set as the limit in FIG. 7, this ratio may vary depending upon the capability of the control circuit.

The difficulty in controlling a very small light emission is mainly attributable to the nature of the flash tube (xenon tube) and the delay occurring at the control circuit. Namely, the difficulty is attributable to the length of time elapsing after the light emission stop signal is output by the circuit shown in FIG. 6 until the light emission actually stops.

Figure 10A:
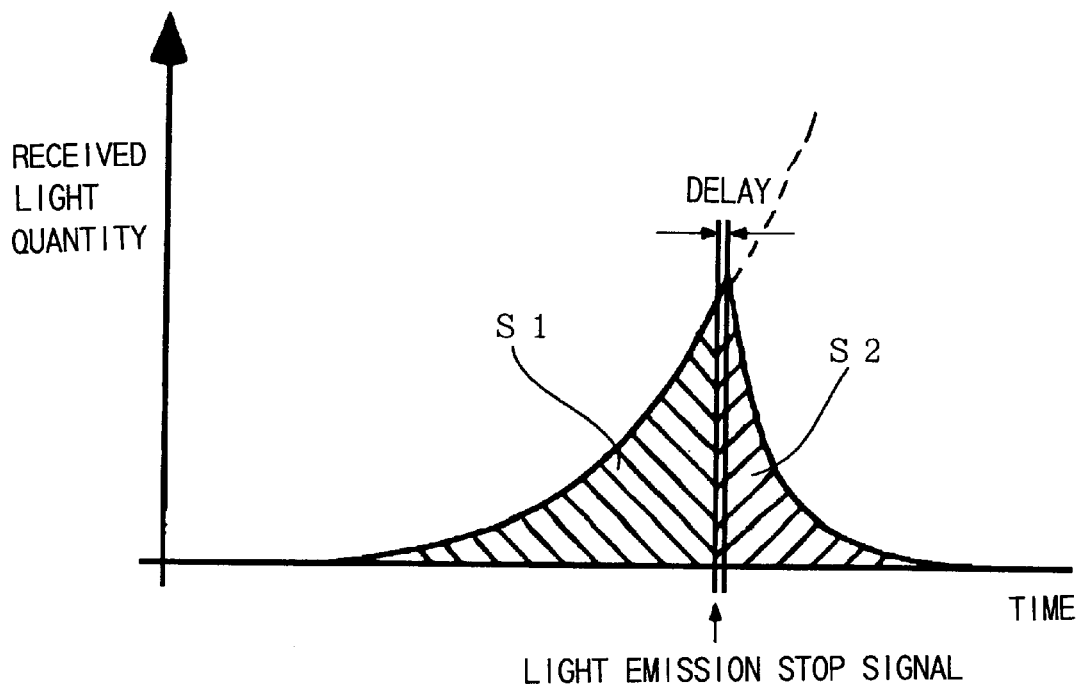
FIGS. 10A and 10B illustrate the relationship between the quantity of light received at the photodiode and the length of time elapsing, specifically representing a state after the light emission stop signal is output until the light emission stops.
Figure 10B:
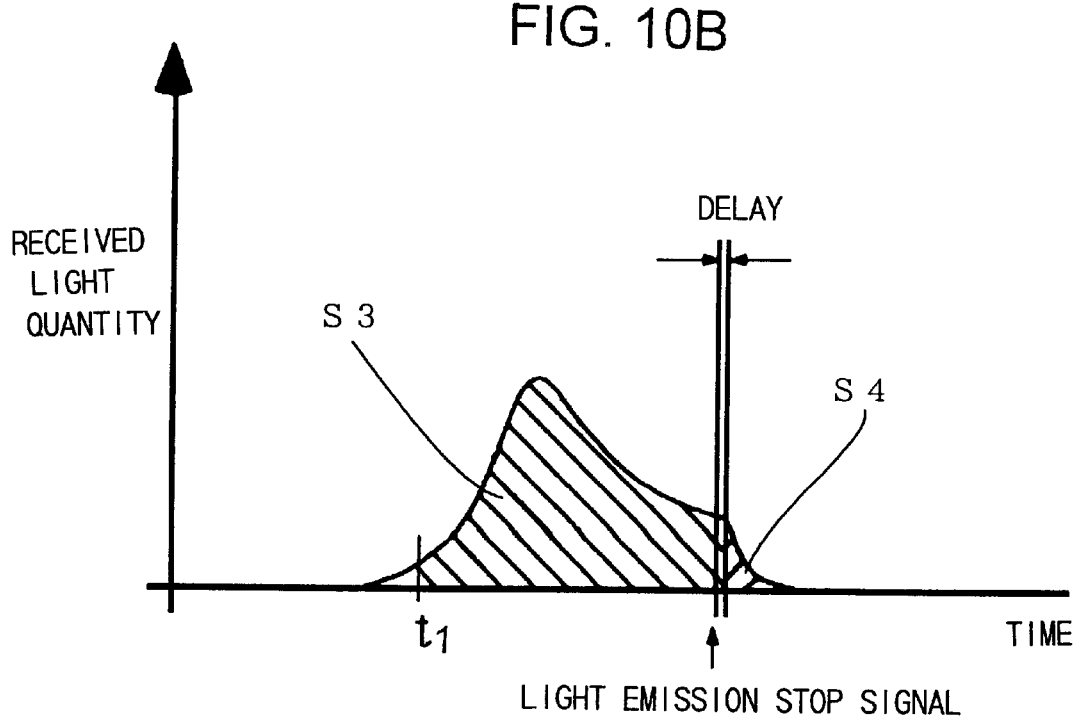

FIGS. 10A and 10B illustrate the relationship between the quantity of light received at the photodiode PD and time, and more specifically they illustrate the state manifesting after the light emission stop signal is output until the light emission stops.

FIG. 10A illustrates an example in which the light emission stop signal is output relatively soon after the light emission starts at the strobe. FIG. 10B illustrates an example in which the light emission stop signal is output much later after the light emission starts at the strobe. In FIG. 10B, the light emission stop signal is output when most of the light corresponding to the full light emission quantity at the strobe has been emitted. The timing with which the light emission stop signal is output in FIG. 10A corresponds to the time point t1 in FIG. 10B, and FIG. 10A illustrates this portion in an enlargement.

In FIGS. 10A and 10B, areas S1 and S3 indicate the quantities of light emitted after the light emission starts at the strobe until the light emission stop signal is output. In addition, in FIGS. 10A and 10B, areas S2 and S4 indicate the quantities of light emitted after the light emission stop signal is output, which represents the quantities of control error referred to as "residual light."

There is no need for implementing special control as long as there are no areas S2 and S4. However, the areas S2 and S4 increase as the fractional ratio (stop pulse value/full light emission pulse value) in FIGS. 7 and 8 become smaller. As a result, as the fractional ratio becomes smaller, the quantity of light emitted by the strobe may come to greatly exceed the control target. Thus, the fractional ratio is set equal to or larger than a specific value with the value used as the limit of the control-enabled range. The same situation arises in the analog control method in the prior art, and there is a limit to the control-enabled range in the automatic flash control achieved through the analog control method, as in FIGS. 7 and 8.

Accordingly, a method of preventing the accuracy of the flash control implemented on the strobe light emission quantity from becoming lowered in the range over which the fractional ratio is small (e.g., a photographing operation performed with the aperture value set to a small value) is explained. In this method, the constant current value in FIG. 6 (also in FIGS. 1 and 3) is varied in correspondence to the aperture value.

In FIGS. 7 and 8, the full light emission pulse value is set at 10,000. This value for the full light emission pulse value is determined by setting the constant current value while ensuring that the circuit of the capacitor Cpd is not caused to overflow even for a moment by the photoelectric current at the photodiode PD when the frequency of the sample clock CK is set at a specific level and the minimum control distance is 0.5 m.

As long as it is known in advance that the light emission stop signal is to be output before the photoelectric current at the photodiode PD reaches its peak value, the resolution of the light emission quantity detection can be raised to improve the flash control accuracy by setting the constant current at a smaller value.

For instance, with the ISO at 100 and the aperture value at f16, the fractional ratio in FIG. 7 is 625/10,000, and it is obvious that the light emission stop signal will be output before light corresponding to 10% of the full light emission quantity is emitted. The fractional ratio increases as the photographing distance increases. However, since the peak current itself becomes reduced in inverse proportion to the square of the distance, the circuit of the capacitor Cpd is not caused to overflow by the photoelectric current.

FIGS. 11 and 12 indicate the relationship between the stop pulse value and the full light emission pulse value at varying ISO values, aperture values, distances and constant current ratios. In FIGS. 11 and 12, the peak of the photoelectric current is set at approximately 25%~35% of the full light emission pulse value and, therefore, the constant current value is set in correspondence to the ISO value and the aperture value while allowing for a certain circuit safety margin.

The "constant current ratio" in FIGS. 11 and 12 represents the ratio of the fixed constant current in FIGS. 7 and 8 set at "1" to the constant current actually flowing through the circuit. In FIGS. 11 and 12, the constant current ratio is set at 1/8 at aperture values f4 and f5.6 with the ISO at 100, for instance. As a result, the accuracy of the photoelectric current detection resolution is improved eight-fold compared to the accuracy in FIGS. 7 and 8.

In the circuits illustrated in FIGS. 1, 3 and 6 described earlier, the accuracy with which the timing of the light emission stop signal output is controlled can be improved by varying the constant current ratio, as indicated in FIGS. 11 and 12. However, such an improvement in the control accuracy cannot be realized through the discharge of the photoelectric current performed via the resistors described in reference to the prior art, and this proves the advantage of the present invention.

In FIGS. 11 and 12, the constant current ratio takes base 2 exponential values of, (1, 1/2, 1/4 . . . ) in correspondence to individual aperture values to cover the dynamic range.

However, the present invention is not limited to using the system of base 2 exponential values described above and, instead, a plurality of constant current values may be provided to enable a selection from them.

Figure 24:
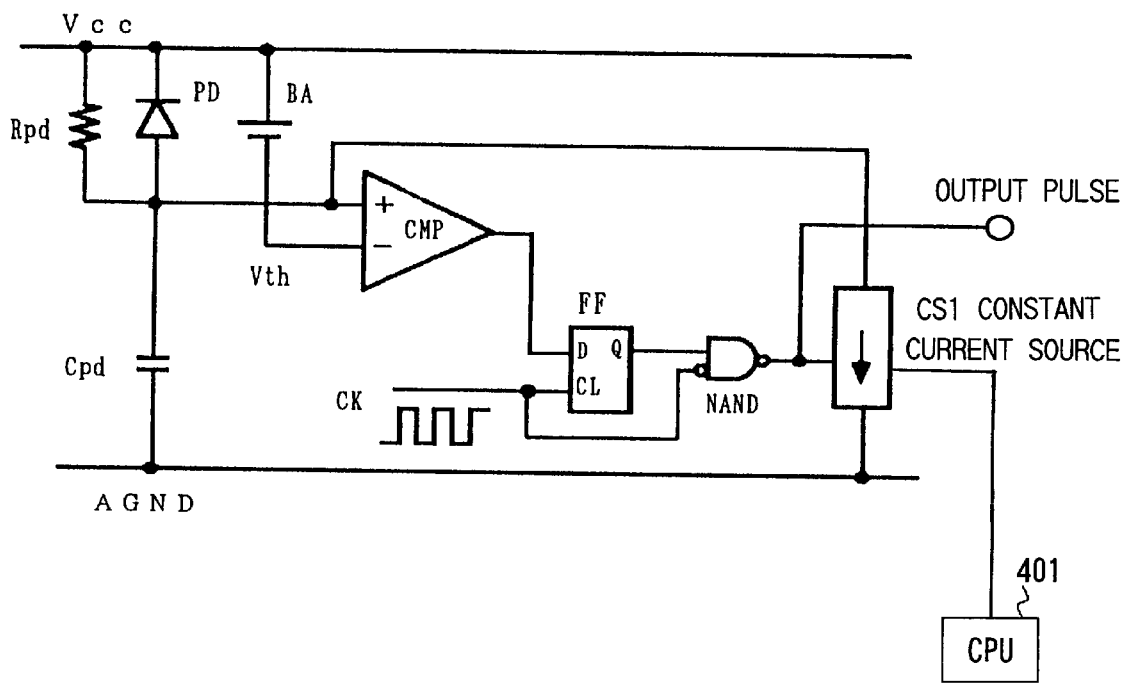
FIG. 24 is a circuit diagram of a circuit that digitizes the quantity of light received from a strobe capable of controlling the selection of a constant current value among a plurality of constant current values.

FIG. 24 is a circuit diagram of a circuit that digitizes the quantity of light received from a strobe, which enables control implemented by making a selection from the plurality of constant current values mentioned above. Basically, the circuit structure is similar to that illustrated in the circuit diagram in FIG. 1, and in this circuit, the constant current source CS1 can be controlled by a CPU 401 of the strobe. The constant current source CS1 is provided with a circuit capable of generating a plurality of constant current values, and a specific constant current value is selected from the plurality of constant current values by a control signal provided by the CPU 401 to perform an operation at the selected constant current value.

It is easier to directly use the individual constant currents actually flowing through the circuits than adjusting the individual constant currents flowing through them at a specific current value (e.g., a current value achieving a current ratio of 1/2, 1/4 . . . ) in FIGS. 1, 3, 6 and 24.

In addition, it is desirable to store the values of various constant currents that actually flow through the circuit or the ratios of them to the reference current value in a non-volatile memory and to set a reference value to be input to the digital comparator 11 in FIG. 6 in correspondence to the contents of the data stored in the memory. For instance, if the design value of the constant current differs from the constant current flowing through the actual circuit in FIG. 1, 3 or 6, the quantity of deviation is stored in the non-volatile memory (not shown) to correct the light emission quantity based upon the stored quantity of deviation. More specifically, the strobe CPU illustrated in FIG. 24 is added to the structure shown in FIG. 6. Then, the CPU corrects the reference value input to the digital comparator 11 in FIG. 6 by a correction quantity corresponding to the number of pulses representing the deviation quantity read from the memory (not shown).

By varying the value setting for the constant current in correspondence to the aperture value, the accuracy of the timing with which the light emission stop signal is output is improved. However, the problem of the control error caused by the residual light explained earlier in reference to FIGS. 10A and 10B is not solved by varying the constant current value setting. Since it is physically impossible to eliminate residual light completely, various types of corrections are implemented to reduce residual light in the analog-type control in the prior art. In short, the areas S2 and S4 corresponding to the quantity of residual light are estimated and the light emission stop signal is output at an early stage to achieve the light emission quantity that is close to the areas S1 and S3 in FIGS. 10A and 10B.

However, as FIGS. 10A and 10B clearly indicate, the ratio of the area S2 to the area S1 and the ratio of the area S4 to the area S3 greatly change in correspondence to the length of light emission time elapsing until the light emission stop signal is output.

As the subject is positioned closer to the strobe or as the ISO value increases, the light emission must be stopped after a shorter period of emission time, since the area (S2) corresponding to the quantity of residual light is not small enough to be disregarded relative to the area (S1). However, when the length of emission time extends longer as shown in FIG. 10B, the area S4 becomes small enough to be disregarded relative to the area S1.

Next, several methods that may be employed to correct the quantity of residual light (S2, S4) are explained.

First, a method achieved by subtracting an appropriate fixed value from a given threshold value to set the reference value input to the digital comparator 11 in FIG. 6 is explained.

Due to the nature of residual light explained earlier, the method of correction achieved by subtracting an appropriate fixed value from the threshold value to obtain a reference value is, in principle, an imperfect solution. However, this method is effective in the sense that the flash control error can be averaged over short distances and long distances.

For instance, as FIGS. 7 and 8 clearly indicate, the stop pulse value at ISO 100, aperture f5.6 and range 0.5 m is 78 pulses. Let us assume that S2/S1 is 0.5 (equivalent to 0.5EV) at the distance of 0.5 m and that there is no error in the long range. In this case, an error of +0.5EV manifests under normal control implemented at the distance set to 0.5 m. However, by subtracting an appropriate fixed value from the threshold value to set it as the reference value, the error can be averaged to −0.25EV for the long distance and +0.25EV at 0.5 m. This method is easy to implement and is quite effective in practical use.

When the method of correction achieved by subtracting an appropriate fixed value from the given threshold value to set it as the reference value to be input to the digital comparator 11 in FIG. 6 is adopted, the rule whereby the reference value is doubled by darkening the aperture value by one level as indicated in FIGS. 7 and 8 no longer applies. In practical use, a value that will allow flash control over the entire distance range, from short distance to long distance, to be executed with good balance is searched and then stored in the non-volatile memory to be used as an adjustment element. In addition, since the values to be subtracted from the reference value changes in correspondence to various aperture values and ISO values, it is necessary to store in memory those individual values.

Now, the second method achieved by correcting the reference value over time, is explained. The rate at which control error is attributed to residual light (the ratio of S2 to S1 in FIG. 10A) is affected by the timing with which the light emission stop signal is output. Thus, after a light emission starts at the strobe, the reference value is dynamically varied over time.

When the reference value is set by the CPU, it takes approximately 10 μsec, for instance, to overwrite the reference value. However, this does not pose any problem, since approximately 250~300 μsec elapses from a light emission start until the peak position is achieved. In addition, the second method can be realized with ease in practical use. Furthermore, the degree by which the reference value changes should be gradually reduced so that the initial correction quantity is the largest with the correction quantity becoming smaller each time the reference value is updated.

Figure 13A:
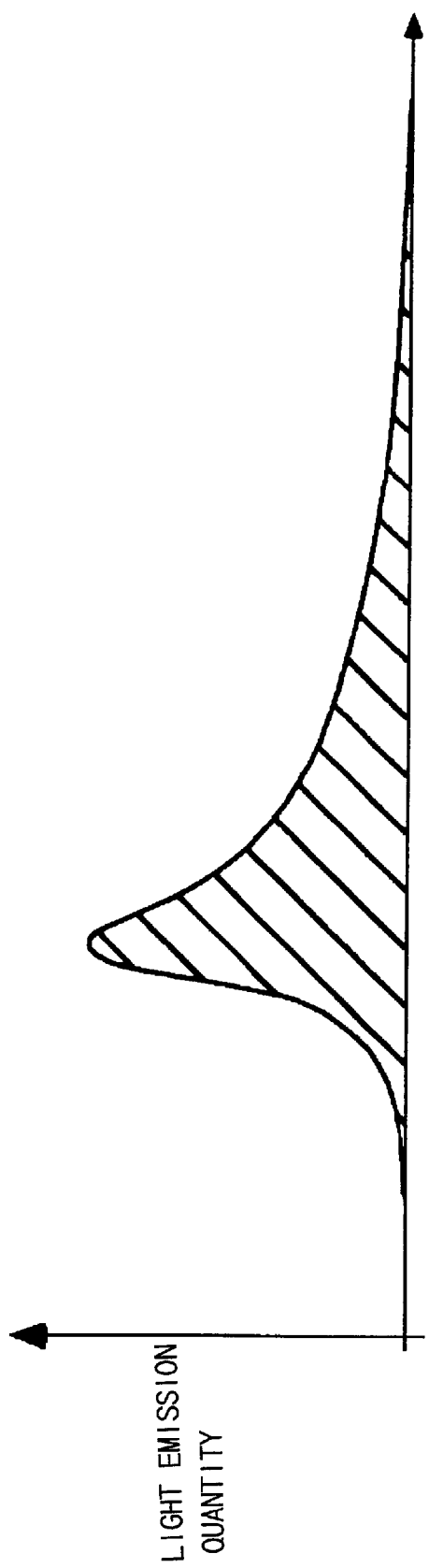
FIGS. 13A and 13B present an example of changes occurring over time in the quantity of light emitted by the strobe and changes occurring over time in the reference value.
Figure 13B:
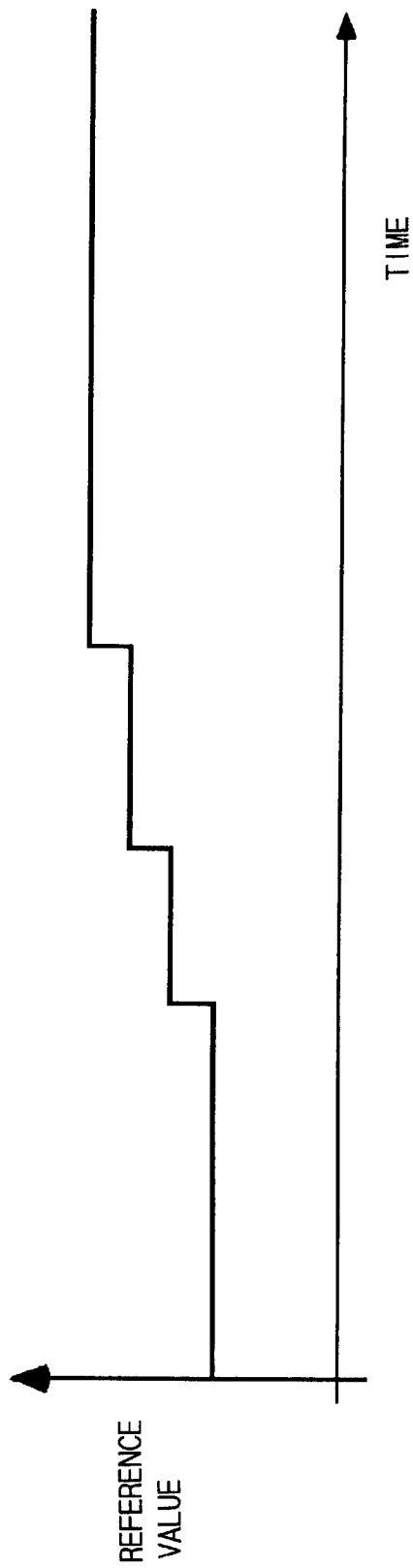

FIGS. 13A and 13B present examples of the changes occurring in the strobe light emission quantity occurring over time and the changes in the reference value occurring over time. It is to be noted that there is a possibility that a light emission stop signal may be generated in response to a match signal erroneously output by the digital comparator due to the output becoming momentarily indeterminate while the CPU is overwriting the reference value. Thus, a special circuitry contrivance may become necessary to invalidate such a momentary match signal.

In addition, if two or more pulses are output from the circuit shown in FIG. 6 while the reference value is being overwritten, the count value at the counter 10 may exceed the new reference value. In this case, the digital comparator 11 continues counting up without outputting a match signal. Such a count-up may be avoided in the following manner. Namely, the degree by which the reference value increases is set larger than the degree by which the count increases during an overwrite of the reference value. Alternatively, the CPU may read the count value at the counter 10 after the reference value is overwritten. In this case, the CPU forcibly outputs a light emission stop signal if the count value is larger than the new reference value resulting from the overwrite and no light emission stop signal has been generated. In addition, a method achieved by updating the reference value in hardware and making the speed at which the reference value is incremented programmable may be adopted instead.

Now, in relation to dynamic updating of the reference value, a method of compensating the bias current at the input terminal of the comparator CMP is explained. Since the current from the high resistor Rpd provided for latch prevention and the leak current from the photodiode PD in FIGS. 1, 3 and 6 fulfill the same function as that achieved by the bias current at the input terminal of the comparator CMP, they are compensated together by adopting the following method.

As explained earlier, the bias current from the input terminal of the comparator CMP is added into the current at the photodiode PD, and thus, the capacitor Cpd becomes charged. As a result, the comparator CMP is at times inverted to High and the NAND circuit NAND output a pulse. In order to compensate for this, the reference value input to the digital comparator 11 shown in FIG. 6 should be increased over time by a degree that corresponds to the bias current.

The bias current must be measured prior to a light emission at the strobe. The bias current includes the photoelectric current output by the photodiode PD in a normal illuminating state. The generation of these currents is not dependent upon strobe light emission for different reasons. Thus, employing the circuit in FIG. 6, the number of pulses is measured in specific time units prior to the strobe light emission to ascertain the speed at which the number of pulses increases. Then, after the strobe light emission, the reference value is corrected in correspondence to the increase and thus updated over the passage of time. The correction of the reference value may be implemented concurrently with the updating of the reference value performed to achieve a correction for the residual light explained earlier.

Now, the third method, which is achieved by performing preliminary photometering is explained. As indicated in FIGS. 7 and 8, the stop pulse value can be determined as long as the full light emission pulse value is ascertained in advance in correspondence to the aperture value and the ISO value. When the stop pulse value is determined, the timing with which the light emission stop signal is to be output can be substantially ascertained so that the correction quantity used to correct for the residual light or the bias current (the correction pulse value) can be set prior to the light emission.

For this reason, before the main emission, which is performed by the strobe in synchronization with film exposure, a light emission emitting a quantity of light approximately one tenth~one hundredth of the full light emission quantity, for instance, is implemented as a preliminary light emission. The quantity of reflected light resulting from this preliminary light emission is measured as the number of output pulses by using the circuit illustrated in FIG. 1, 3 or 6. Based upon the number of pulses resulting from the preliminary light emission thus measured, the number of pulses output during the full light emission is estimated.

The quantity of light emitted in the preliminary light emission itself is not a critical issue as long as the value is small enough. However, it is necessary to be able to ascertain the light quantity ratio of the preliminary light emission and the full light emission with a relatively high degree of accuracy.

In order to emit a very small quantity of light in a preliminary light emission, the strobe is controlled so that the light emission is allowed only for a specific length of time (e.g., approximately 20 µs). In other words, a small quantity of light is emitted in the preliminary light emission through control of the length of the light emission period.

The ratio of the very small light emission quantity and the full light emission quantity can be ascertained through advance testing. Light emission energy is charged at a large capacity capacitor referred to as a main condenser, and if this charge voltage varies, the quantity of light emitted during a light emission implemented over a fixed small length of time also changes. Under normal circumstances, a photographing operation is performed by emitting light at the strobe after charging the main condenser until it achieves a specific level of voltage. However, there are situations in which a photographing operation is performed without waiting for the main condenser to become fully charged in continuous photographing. In such a case, since both the preliminary light emission quantity and the full light emission quantity are smaller than the quantities achieved through a full charge, the light quantity ratio of the preliminary light emission quantity and the full light emission quantity also changes. When this ratio undergoes a great change, the light emission quantity ratio can be estimated by checking the charge voltage at the main condenser.

Figure 14:
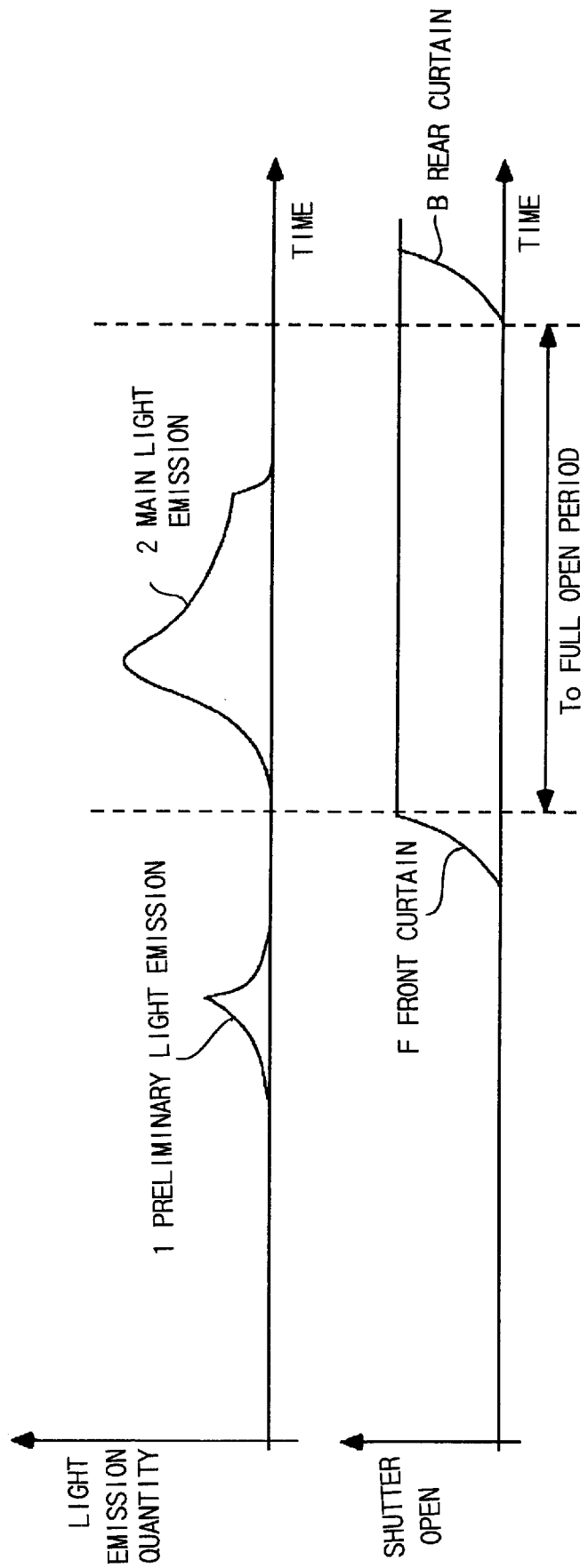
FIG. 14 is a time chart representing an example of a preliminary light emission

FIG. 14 presents a time chart of an operation achieved by implementing a preliminary light emission. In the figure, "1" indicates the waveform of the light emitted in the preliminary light emission and "2" indicates the waveform of the light emitted in the main light emission. In the preliminary light emission, a very small quantity of light is emitted so as to ensure that the guide number at the strobe is not set to an excessively small value.

In FIG. 14, F indicates the run of the shutter front curtain and B indicates the run of the shutter rear curtain. In addition, "To" indicates the period of time over which the shutter is fully open, i.e., the period over which the entire surface of the film is exposed.

By performing a preliminary light emission, the full light emission pulse value can be approximately estimated. Accordingly, an explanation is given on a method that achieves an improvement in the flash control accuracy by changing the level of the constant current in correspondence to the estimated full light emission pulse value.

In the example presented in FIGS. 7 and 8, the full light emission pulse value is 10,000. This value is set by ensuring that the circuit of the capacitor Cpd will not overflow even at the peak of the photoelectric current at the photodiode PD when the strobe emits light at the minimum photographing distance of 0.5 m. The ratio of the full light emission pulse value in a preliminary light emission and the full light emission pulse value at the minimum photographing distance is equivalent to the rate at which the peak current becomes attenuated between the preliminary light emission and the light emission performed at the minimum photographing distance. Thus, by reducing the constant current based upon the attenuation factor, the full light emission pulse value can be set equal to the full light emission pulse value at the minimum photographing distance.

In terms of circuitry, it is desirable to select integers for the current ratio of the photoelectric current in the preliminary light emission and the photoelectric current in the main light emission, since a current ratio set as an integral value will facilitate IC design. In addition, the current ratio may be set as a base 2 exponential value to effectively cover the dynamic range. Furthermore, an appropriate constant current may be selected from a plurality of constant current options to achieve a great improvement in the flash control accuracy in practical use over control achieved by using a single constant current. When the constant current is varied in correspondence to the aperture value as described earlier, a common constant current selected from the plurality of constant currents can be utilized in the circuit structure.

However, the preliminary light emission must be performed immediately before the shutter opens. As a result, the strobe and the camera must achieve synchronization in the photographing sequence. Cameras manufactured in recent years are normally capable of conducting communication with the strobe. This means that the camera transmits a timing signal to the strobe to allow it to start preliminary light emission. The strobe, for its part, transmits a shutter run-enable signal to the camera to sustain the shutter in a run-standby state until the preliminary light emission is completed. It is to be noted that it is necessary to verify through communication prior to a shutter release start that both the camera and the strobe support a preliminary light emission implemented in the automatic flash control mode.

Figure 15:
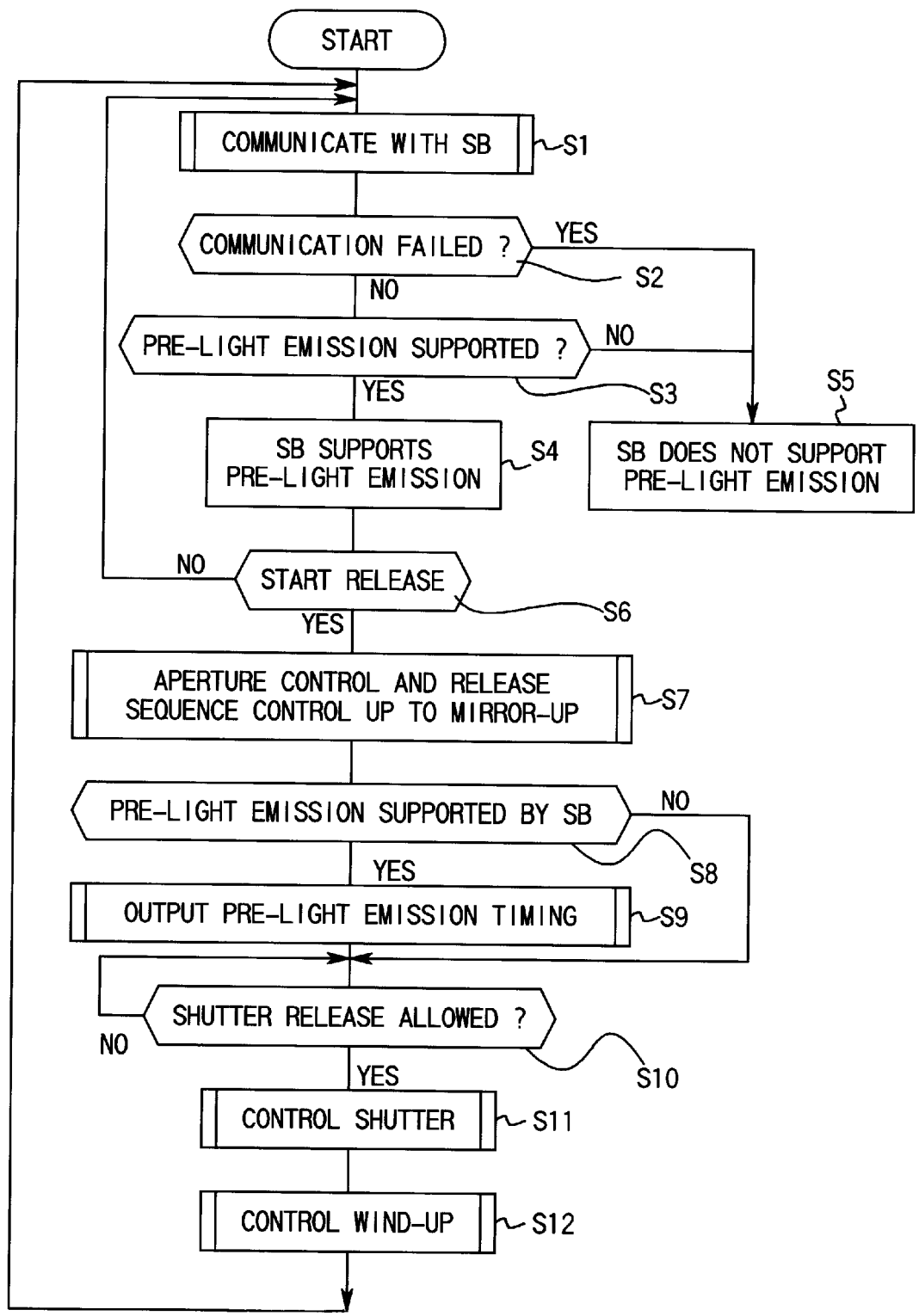
FIG. 15 is a schematic flowchart of the control implemented on the camera side during automatic flash control achieved through a preliminary light emission.

FIG. 15 is a flowchart outlining the automatic flash control implemented on the camera side by performing a preliminary light emission. In addition, FIG. 16 is a flowchart that outlines the automatic flash control implemented on the strobe side by performing the preliminary light emission.

Figure 16:
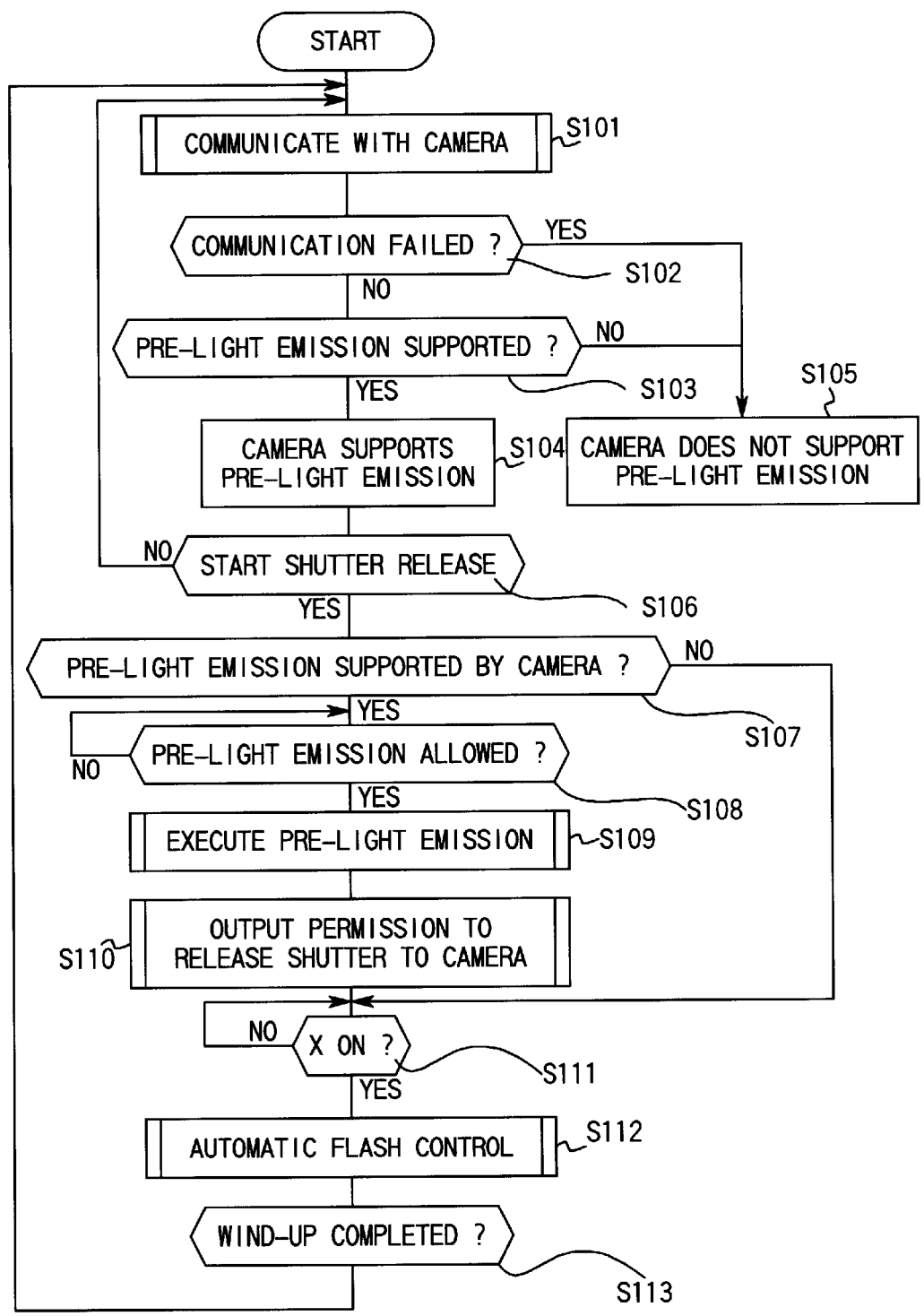
FIG. 16 is a schematic flowchart of the control implemented on the strobe side during automatic flash control achieved through a preliminary light emission.

The following is an explanation of the preliminary light emission procedure and the main light emission procedure, given in reference to the flowchart in FIGS. 15 and 16.

As shown in step S1 in FIG. 15 and step S101 in FIG. 16, the camera CPU and the strobe CPU engage in regular communication with each other as a regular routine.

In step S2, the camera CPU attempts communication with the strobe to make a decision as to whether or not the strobe is capable of conducting communication with the camera. The camera CPU proceeds to step S3 if it is decided that the strobe is capable of conducting communication.

In step S3, the camera CPU makes a decision as to whether or not the strobe responds to a preliminary light emission synchronous signal for in automatic flash control photographing.

If it is decided in step S2 that the strobe does not engage in communication or in step S3 that the strobe does not perform a preliminary light emission, the camera CPU stores the information that the strobe is not capable of preliminary light emission at a flag in step S5.

If, on the other hand, it is decided in step S2 that the strobe is capable of conducting communication and also in step S3 that the strobe is capable of performing a preliminary light emission, the camera CPU stores the information that the strobe is capable of performing a preliminary light emission at a flag in step S4.

At the strobe CPU, an operation that is similar to that performed in step SI to step S5 on the camera side is performed from step S101 through step S105. Namely, in step S102, the strobe CPU makes a decision as to whether or not the camera is the type that engages in communication with the strobe. Then, in step S103, the strobe CPU makes a decision as to whether or not the camera requests a preliminary light emission synchronous signal in automatic flash control photographing. If the camera supports preliminary light emission, the strobe CPU stores the information at a flag in step S104. If, on the other hand, the camera does not support preliminary light emission, the strobe CPU stores the information that the camera does not support preliminary light emission at a flag in step S105.

It is to be noted that there are other strobe flash control modes in addition to the automatic flash control mode. The selection of a specific flash control mode setting is made through a setting at an operating member on the strobe side. Thus, the following communication is performed during the handshake between the camera and the strobe in step S1 and step S101. The strobe CPU transmits communication data that contain information that "the automatic flash control photographing mode is set" and information that a "preliminary light emission synchronous signal is requested" to the camera side. In response, the camera CPU notifies the strobe that "it acknowledges that a preliminary light emission synchronous signal is to be output in the automatic flash control mode." If this handshake is not completed successfully, the strobe cannot execute automatic flash control accompanied by a preliminary light emission. In such a case, the strobe selects an appropriate constant current in correspondence to the aperture value.

In step S6 in FIG. 15, the camera performs a release start detection. Normally, a release is started by pressing down a shutter release button at the camera. The camera CPU notifies the strobe of a release start (not shown).

In step S106 in FIG. 16, the strobe detects the "release start" notice sent by the camera.

In step S107 in FIG. 16, the strobe CPU makes a decision as to whether or not the camera is capable of supporting preliminary light emission by referencing the flag set in step S104 and step S105. If it is decided that the camera supports preliminary light emission, the strobe CPU makes a decision in step S108 as to whether or not a timing signal that allows a preliminary light emission has been received from the camera. If the timing signal has not been received yet, the strobe CPU repeats the decision-making in step S108 until it receives the timing signal. It is to be noted that if it is decided in step S107 that the camera does not support preliminary light emission, the operation proceeds to step S111.

After the camera and the strobe acknowledge the start of the release sequence in step S7 in FIG. 15, the camera CPU raises the main mirror and stops down the lens. When these operations are completed, the camera enters a film exposure enabled state by running the shutter. If the camera CPU decides, in step S8, by referencing the flags set in step S4 and step S5, that the strobe is not capable of performing a preliminary light emission, the operation immediately proceeds to step S10. If, on the other hand, it is decided in step S8 that the strobe is capable of performing a preliminary light emission, the operation proceeds to step S9.

In step S9, the camera CPU transmits a timing signal that allows a preliminary light emission to the strobe.

The strobe CPU detects the timing signal in step S108 in FIG. 16, and performs a preliminary light emission, emitting a very small quantity of light, in step S109. Based upon the results of the measurement of reflected light attributable to the preliminary light emission, the constant current to be used in the main light emission is selected.

In step S110, the strobe CPU outputs a shutter release enable signal to the camera following the completion the preliminary light emission at the strobe.

In step S9 in FIG. 15, the camera CPU runs the shutter rear/front curtains to start exposure in response to the shutter release enable signal.

Next, in step S11, the camera CPU executes control on the run of the shutter front curtain and the shutter rear curtain.

It is to be noted that only a short period of time is required to perform the preliminary light emission, and that the front curtain may be allowed to start its run when a specific length of time has elapsed after step S9. In such a case, step S110 and step S10 can be eliminated. However, instead of implementing step S10, it becomes necessary to create a delay over the specific length of time. With the procedures described above completed, the strobe preliminary light emission control ends. When the front curtain completes its run, the camera CPU outputs a synchronous signal from its X contact point to notify the strobe of the timing of the main light emission. This signal is directly input to the strobe.

In step S111 in FIG. 16, the strobe CPU immediately starts a main light emission upon detecting the synchronous signal and, in step S112, the strobe CPU controls the light emission quantity.

After the shutter period of time elapses, the camera allows the rear curtain to run. It is to be noted that in FIG. 15, the control on the front curtain run and the control on the rear curtain run at the shutter are integrated in step S11.

Subsequently, the camera winds up the film, completes the entire photographing sequence and returns to step S1. The strobe detects the completion of the wind-up in step S113 before returning to step S101.

Figure 17:
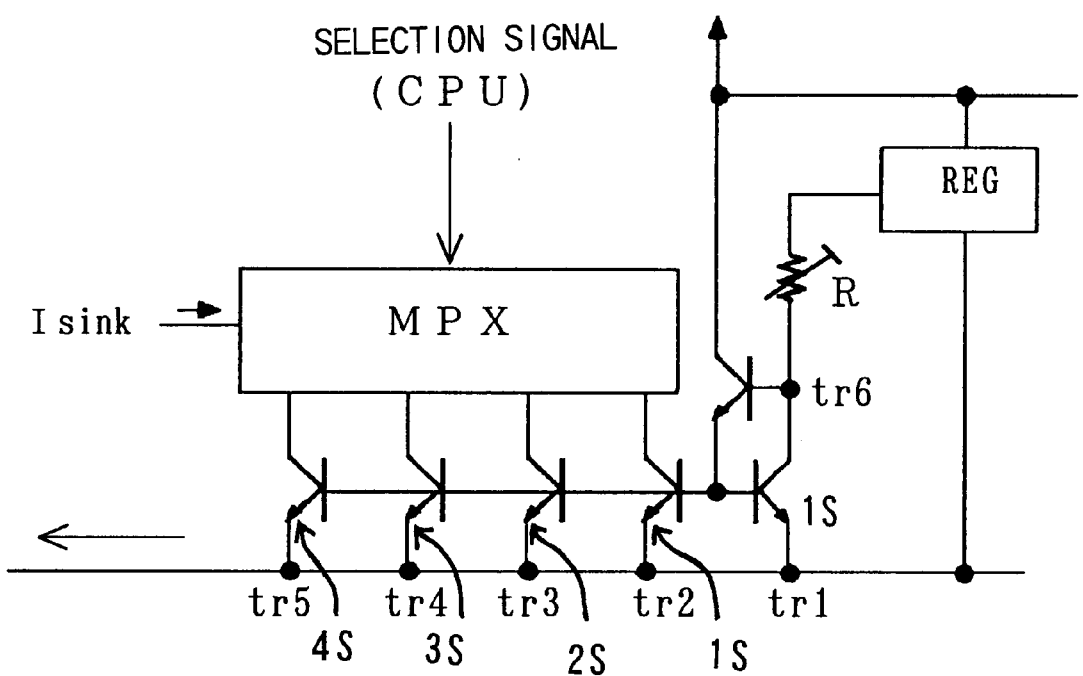
FIG. 17 illustrates the constant current circuit achieved by employing a current mirror circuit.

FIG. 17 illustrates the constant current source CS1 in FIGS. 1 and 6 achieved by using a current mirror circuit. In FIG. 17, the constant voltage circuit REG supplies a constant current to the collector of the transistor Tr1 via a resistor R. The transistors Tr2~Tr5 extract electrical currents corresponding to the areas of the respective emitters from their own collectors in conformance to the level of the voltage generated between the base and the emitter of the transistor Tr1. The ratios of the base areas of the transistors Tr2~Tr5 relative to the emitter area of the transistor Tr1 represent the multiplication factors at which the emitter current (≈collector current) of the transistor Tr1 is multiplied to achieve the emitter currents at the transistors Tr2~Tr5.

In FIG. 17, "1s" indicates the emitter area at the transistor Tr1 and the emitter areas at the individual transistors Tr2~Tr5 are indicated as 1s~4s. They indicate the following. Namely, the transistor Tr2 extracts an emitter current, the level of which is the same as that of the emitter current at the transistor Tr1, the transistor Tr3 extracts an emitter current, the level of which is twice that of the emitter current at the transistor Tr1, the transistor Tr3 extracts an emitter current, the level of which is four times that of the emitter current at the transistor Tr1 and the transistor Tr4 extracts an emitter current, the level of which is eight times that of the emitter current at the transistor Tr1.

A transistor Tr6 supplies a base current to the transistors Tr1~Tr5.

A multiplexer MPX selects one of the four transistor output currents in response to the instruction provided through a selection signal from the CPU at the strobe (not shown). The selected constant current is utilized as, for instance, the constant current in FIG. 1. The collectors of the other transistors that have not been selected by the multiplexer MPX are connected to the circuit source voltage Vcc. In addition, in FIG. 17, the current Isink indicates a current that is discharged from the capacitor Cpd and input to the constant current source CS1 in FIG. 3.

As is obvious from the explanation given above, the following advantages are achieved in the individual embodiments.

Firstly, since the number of discharges and the quantity of discharged electrical charge at the capacitor Cpd are in proportion to each other, accuracy in the strobe flash control is achieved.

Secondly, since a constant current discharge from the capacitor Cpd is realized by stabilizing the reverse bias voltage at the photodiode PD, strobe flash control that is less readily affected by the level of the circuit source voltage is achieved.

Thirdly, in the so-called automatic flash control mode, in which the light emitted by the strobe is detected by a photodiode provided on the strobe side and a light emission stop signal is generated in correspondence to the ISO value and the aperture value, the following specific advantages are achieved.

(a) By varying the constant current used to discharge the photoelectric current in correspondence to the photographic aperture value and the ISO sensitivity, the flash control accuracy is improved.

(b) By detecting the strobe light emission quantity as a digital value in real time and gradually changing the reference value, which is used for comparison against the digital value at the digital comparator 11, from the reference value setting at the start of the light emission, the timing with which the light emission stop signal is output can be adjusted. As a result, the degree of adverse effect of the error referred to as residual light can be reduced.

(C) By emitting a very small predetermined quantity of light immediately before film exposure during a photographing operation, measuring the resulting reflected light to estimate the number of pulses that will be detected in the full light emission based upon the measured value and changing the constant current used to discharge the photoelectric current in correspondence to the estimated pulse value, the accuracy of the flash control is improved.

Fourth Embodiment

As explained in detail above, in the first~third embodiments, the strobe light emission measurement resolution is improved and higher accuracy in light emission quantity control is achieved by varying the constant currents in FIGS. 1, 3 and 6 in correspondence to the aperture value.

Now, let us re-confirm the factor that determines the strobe light measurement accuracy. The determining factor is the peak current Lpeak at the light-receiving element as is clearly indicated in formula (1) and in FIG. 4. As the level of the peak current Lpeak rises relative to the storage quantity (integrated quantity) of the photoelectric current generated by strobe light, the constant current needs to be set at a higher level as well.

Setting the constant current at a high level directly results in a reduction in the measurement resolution. While the waveform of emitted light is determined by the characteristics of the flash tube (xenon tube) at the strobe, the peak light emission quantity (peak current), which is normally quite large, necessitates that the constant current be set at a fairly high level and, as a result, a full improvement in the flash control accuracy cannot be achieved through the invention disclosed in the first through third embodiments.

The following is an explanation of the fourth embodiment of the present invention, achieved on the premises of the invention disclosed in the first through third embodiments.

Figure 18:
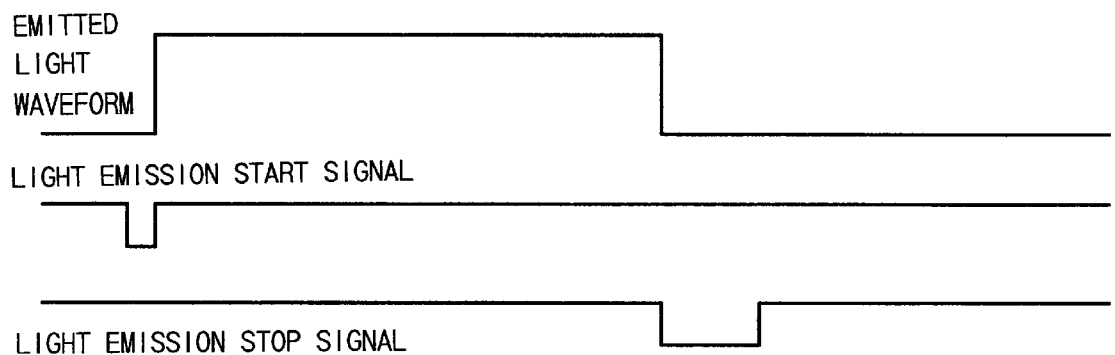
FIG. 18 is a waveform diagram showing an ideal light emission waveform that achieves the maximum resolution for the measurement of strobe light.

FIG. 18 is a waveform diagram showing the waveform of emitted light, which achieves the highest possible measurement resolution. As FIG. 18 indicates, the measurement resolution is maximized when the strobe light emission quantity is constant.

Figure 19:
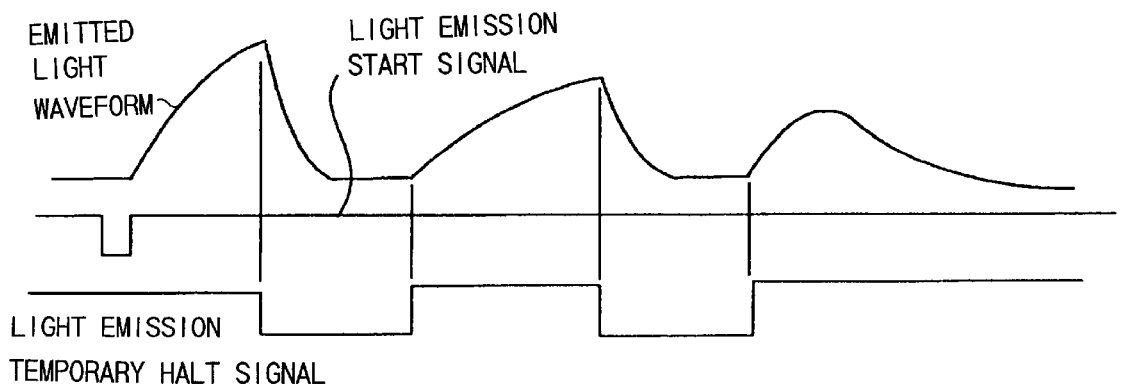
FIG. 19 is a waveform diagram representing an example of split light emissions performed repeatedly.

However, the ideal waveform of emitted light in FIG. 18 cannot be realized by employing a flash discharge tube in reality. Accordingly, in this embodiment, a split light emission is repeatedly performed, as shown in FIG. 19. Flash control for each strobe light emission is implemented by employing the circuit explained earlier in reference to FIG. 1, 3 or 6. The fourth embodiment differs from the previous embodiments in that the flash control achieved by employing the circuit shown in FIG. 1, 3 or 6 is executed repeatedly.

Namely, by emitting light repeatedly from the strobe and thus keeping down the peak value of the light emission quantity corresponding to each light emission, the peak current output from the light-receiving element (photodiode) is suppressed. As a result, the constant current in FIG. 1, 3 or 6 can be set at a low value, to improve the resolution in the flash control. In other words, the total number of pulses output through split light emissions is larger compared to the number of pulses output as a result of a single strobe light emission.

FIG. 20 is a block diagram of the fourth embodiment. More specifically, FIG. 20 illustrates the control circuit that realizes the split light emissions shown in FIG. 19. The control circuit in FIG. 20 receives the output pulses from the NAND circuit NAND shown in FIG. 6 (or FIG. 1 or FIG. 3) and the light emission start signal in FIG. 6, and outputs a light emission temporary halt signal and a light emission stop signal. The light emission start signal is output from the camera to the strobe via the so-called X contact point of the camera.

The light emission temporary halt signal is output a plurality of times to implement split light emissions after the strobe light emission starts, as illustrated in FIG. 19, and is a pulse signal sustained over, for instance, approximately several tens of $\mu$sec. In addition, the light emission full stop signal is provided to completely stop the strobe light emission.

The control circuit 30 in FIG. 20 may be divided into two main circuit portions. The first circuit portion engages in control of the split light emissions. The first circuit portion mainly comprises the circuit portions of a digital comparator 310, a first counter 311, a memory 312 that stores a first reference value and a one-shot 313. The first circuit portion has a structure extremely similar to the structure constituted of the counter 10, the digital comparator 11 and the one-shot 12 in FIG. 6, however, while the one-shot timer 12 in FIG. 6 outputs a light emission stop signal that completely stops strobe light emission, the one-shot 313 in FIG. 20 outputs a light emission temporary halt signal that temporarily halts the strobe light emission.

The second circuit portion engages in control of the full light emission quantity at the strobe. The second circuit portion mainly comprises a digital comparator 320, a second counter 321, a memory 322 that stores a second reference value, a latch circuit 323 and AND circuits 324 and 325.

It is to be noted that as shown in the figure, the control circuit 30 is connected to a CPU 20. The CPU 20, which is provided to control the entire strobe, sets the first reference value, the second reference value, the light emission temporary halt signal (pulse width) and the like.

In the structure described above, the photodiode PD in FIG. 1, 3 or 6 may be designated as a photoelectric conversion device. The capacitor Cpd in FIG. 1, 3 or 6 may be designated as a storage device and a current/voltage conversion device. The comparator CMP, the D-type flip flop FF, the NAND circuit NAND and the constant current source CS1 in FIG. 1, 3 or 6 may be designated as a constant current discharge device. The D-type flip flop FF and the NAND circuit NAND may be designated as a pulse signal output device. The control circuit in FIG. 20 may be designated as a split light emission execution device or a light emission stop device.

Next, the operation performed by the control circuit 30 in FIG. 20 is explained. The control circuit 30 receives a light emission start signal and output pulses output by the NAND circuit NAND, and starts a control operation. In addition, the strobe (not shown) starts the light emission in response to a light emission start signal.

Namely, the light emission start signal is input to the second counter 321 and a reset terminal rst of the latch circuit 323, thereby resetting the second counter 321 and the latch circuit 323. It is to be noted that the first counter 311, too, is reset at this time.

The output pulses from the NAND circuit NAND input to the control circuit 30 are input to the first counter 311 and the second counter 321 and counted, as shown in the figure.

The count value at the first counter 311 is compared against the first reference value (stored at a memory 312) in the digital comparator 310. In addition, the count value at the second counter 321 is compared against the second reference value (stored at a memory 322) in the digital comparator 320.

First, the operation achieved in the first circuit portion is explained. When the count value at the first counter 311 matches the first reference value, the digital comparator 310 outputs a match signal to the one-shot 313. In responds to the match signal, the one-shot 313 outputs a light emission temporary halt signal. The light emission temporary halt signal, is a pulse signal sustained over several tens of $\mu$ sec at the most, and the flash discharge tube is still in an active state when the output of the light emission temporary halt signal ends. As a result, when the output of the light emission temporary halt signal ends, the flash discharge tube re-starts a light emission. In other words, the flash discharge tube repeatedly emits light at the light emission quantity corresponding to the count value set as the first reference value.

In addition, the light emission temporary halt signal output by the one-shot 313 is input to the reset terminal rst of the first counter 311 via the AND circuit 324. In other words, the first counter 311 is reset each time the one-shot 313 outputs a light emission temporary halt signal to start counting output pulses from 0 again.

The first circuit portion repeats the series of operations described above until a light emission full stop signal is output by the second circuit portion. As a result, the flash discharge tube repeats split light emission. As is obvious from the explanation given above, the first reference value and the number of light emissions performed by the flash discharge tube are in reverse proportion to each other. In other words, if the first reference value is set at a small value, the flash discharge tube performs many light emissions.

The second circuit portion, on the other hand, performs the following operation. Namely, the second counter 321 counts the total number of output pulses accumulated since light emission start. The digital comparator 320 detects a match between the count value at the second counter 321 and the second reference value (memory 322) and outputs a match signal to the latch circuit 323. The latch circuit 323 outputs a light emission full stop signal sustained over a long period of time, e.g., approximately 10 msec, via the AND circuit 325. As a result, the flash discharge tube completely ends the light emission.

FIG. 21 is a waveform diagram illustrating an example of split light emissions implemented in the embodiment shown in FIG. 20. In FIG. 21, Tstop represents the period of time over which the light emission temporary halt signal generated by the one-shot 313 is output and Ton represents the period of time over which the first counter 311 counts from 0 to the value matching the first reference value, the length of which is determined by the strobe light emission.

In FIG. 21, when the light emission start signal is set to ON, a light emission startup circuit (not shown) triggers the flash discharge tube, and thus, a light emission starts. Then, the NAND circuit NAND shown in FIG. 1, 3 or 6 converts the quantity of light received at the photodiode PD to an output pulse which is then input to the control circuit 30 shown in FIG. 20.

The output pulse is input to both the first counter 311 and the second counter 321 as explained earlier. In FIG. 21, the count value at the second counter 321 does not reach the second reference value, and the light emission temporary halt signal is output over the period Tstop each time the count value at the first counter 311 matches the first reference value. Then, when the light emission temporary halt signal is cleared, the flash discharge tube restarts light emission.

Since the light emission temporary halt signal resets the first counter 311, a light emission achieving the emission quantity corresponding to the first reference value is repeated until the stored charge at the capacitor (not shown, also referred to as the main condenser) charged with the light emission energy becomes depleted.

In the example presented in FIG. 21, the light emission temporary halt signal is output twice and three split light emissions are implemented. The waveform in the figure represents an operation in which a full light emission is achieved through the split light emissions according to the present invention.

FIG. 22 is a waveform diagram corresponding to a state in which the count value at the second counter 321 matches the second reference value while the second split light emission is in progress, resulting in a complete light emission stop. Since the target value of the light emission control is set for the second reference value, the light emitted under the light emission control implemented in the normal automatic flash control mode achieves the waveform in FIG. 22.

It is to be noted that the second counter 321 accurately counts the light emission quantity (corresponding to the residual light following the individual split light emissions) during the period Tstop over which the light emission temporary halt signal is output, as well. Consequently, no error occurs in the measurement of the total light emission quantity in the embodiment.

As explained above, by performing split light emissions, the peak light emission quantity, i.e., the peak current output by the means for photoelectric conversion, can be kept at a low level. As a result, the constant current can be kept down to a low level in FIG. 1, 3 or 6. Consequently, the number of output pulses corresponding to the full light emission can be increased to achieve improvement in the measurement resolution and the flash control accuracy.

It is to be noted that the peak light emission quantity becomes lowered as the number of split light emissions increases. However, since the energy loss occurring at light emission stops increases if a large number of split light emissions are performed, a problem arises in that the total light emission quantity corresponding to the full light emission becomes reduced. Accordingly, it is appropriate to output the light emission temporary halt signal once~three times to improve the photometric accuracy.

As explained earlier, the first reference value (312) and the second reference value (322) in FIG. 20 can be set by the CPU 20 that controls the entire strobe system. As a result, the light emission quantity per split light emission and the target light emission quantity can be set separately. Thus, if the target light emission quantity is close to the full light emission quantity, it is more desirable to set the constant current at a large value, as in the prior art, and not to perform split light emission in order to secure the guide number by placing priority on minimizing energy loss which would increase through split light emission.

Under normal circumstances, the subject distance and the subject reflectance are not known. Consequently, the exact percentage at which the strobe performs a light emission relative to the full light emission quantity is not clear. However, by performing a preliminary light emission at a very small emission quantity prior to film exposure, the percentage can be estimated with a certain degree of accuracy. As a result, when the target light emission quantity is close to the full light emission quantity, the target control pulse value should be set for the second reference value (322) and a value equal to or larger than the second reference value (322) should be set for the first reference value (312) in the structure illustrated in FIG. 20 to avoid implementing split light emission.

Next, flat light emission control implemented to achieve a light emission essentially equivalent to the flat light emission illustrated in FIG. 18 (hereafter referred to as a flat light emission) by repeatedly executing the on/off operation on the flash discharge tube at high speed is explained. The flat light emission control can be achieved by adopting the circuit illustrated in FIG. 20.

The exposure control is implemented by using a focal plane shutter in a standard single lens reflex camera. As is known by persons skilled in the art, the focal plane shutter is provided with a front curtain and a rear curtain. The front curtain and the rear curtain are both mechanically driven by a spring and run over the film surface. Thus, the front curtain and the rear curtain require a specific length of run time to uncover the film and to cover the film.

FIGS. 23A~23C schematically illustrate the running states of the front curtain and the rear curtain and the light emission timing in a single lens reflex camera provided with the focal plane shutter described above.

FIG. 23A schematically illustrates the running states of the front curtain and the rear curtain in the single lens reflex camera. While the front curtain or the rear curtain is running, an area reached by the light flux and an area covered by the shutter curtain and therefore not reached by the light flux are present on the film surface. Thus, it is not suited for a strobe light emission in the prior art. If light is emitted by the strobe, the illuminance of the image formed on the film surface becomes irregular due to the light emitted by the strobe.

The correct timing with which the strobe should emit light corresponds to the period of time over which the shutter is fully open, i.e., the period Topen in FIG. 23A. Consequently, the strobe full light emission must be completed within the period Topen, as illustrated in FIG. 23B. This restricts the shutter speed when the strobe is in use to be within a range of 1/100 sec to 1/400 sec under normal circumstances, with the utilization of a high speed shutter enabled at higher shutter run speeds.

The flat light emission in FIG. 23C eliminates this restriction and enables strobe photographing at a higher shutter speed.

The flat light emission is essentially achieved by performing the split light emissions explained earlier at a higher speed and increasing the number of split light emissions. The waveform achieved in the flat light emission in FIG. 23 may be designated as equivalent to the waveform achieved when irradiation of a constant quantity of light such as sun light is sustained during the shutter run. Thus, by achieving the flat light emission illustrated in FIG. 23, a strobe light emission is enabled during the front curtain and rear curtain shutter runs. In an extreme case, a strobe light emission can be performed even when the shutter curtains are never fully opened.

As explained earlier, the cyclic frequency of the light emissions must be set as high as possible to achieve a flat light emission. However, a problem arises when the cyclic frequency of the light emission is set at a high level, in that energy loss occurs each time the light emission stops, to result in a considerable reduction in the total light emission quantity compared to the total light emission quantity achieved in the regular light emission illustrated in FIG. 4.

However, in spite of this problem, there is a full range of application possibilities for the flat light emission since strobe photographing of a subject within a short distance is enabled at a high shutter speed.

The flat light emission control can be implemented simply by setting the first reference value (312) in FIG. 20 at a value which corresponds to a very small light emission quantity. In FIG. 20, the CPU 20 is capable of setting the first reference value to be stored at the memory 312. In addition, in FIG. 20, by enabling the CPU 20 to set the length of time over which the light emission temporary halt signal output by the one-shot 313 is sustained, the strobe light emission cyclic frequency can be made variable. Thus, the light emission quantity for each light emission and the light emission temporary halt time are programmable (can be set from the outside).

As explained above, by setting the shutter speed in advance or allowing the camera to notify the strobe of the shutter speed, by using the second reference value to set the light emission quantity per light emission and by setting the light emission cyclic frequency in correspondence to the length of time over which the light emission temporary halt signal output by the one-shot 313 is sustained, desired exposure quantity control is realized.

In order to set the light emission quantity per light emission and the light emission cyclic frequency accurately, the quantity of residual light manifesting after the output of the light emission temporary halt signal and the length of time to elapse after the light emission start until the count value at the first counter matches the first reference value need to be estimated.

These estimates may be made through calculation which is performed after implementing at least one preliminary light emission at a very small light emission quantity prior to the film exposure. In this situation, a plurality of preliminary light emissions may be implemented for the following reason. Namely, a plurality of preliminary light emissions are implemented, and when the accumulated light emission quantity reaches a target light emission quantity, the preliminary light emission stop. As a result, the estimation of the light quantity corresponding to the residual light manifesting after the output of the light emission temporary halt signal and the length of time to elapse after the light emission start until the count value at the second counter matches the second reference number is enabled. The technology which allows the preliminary light emission to be implemented a plurality of times is disclosed in, for instance, Japanese Patent Application No. 10-363732 (U.S. patent application Ser. No. 09/469,272). Thus, through the flat light emission, a desired exposure quantity is achieved.

As explained above, in the fourth embodiment, the strobe light emission is achieved through a plurality of split light emissions so as to keep down the light emission peak instead of achieving the strobe light emission through a single light emission as in the prior art. The light emission quantities corresponding to the individual split light emissions are controlled by the first counter 311 and the digital comparator 310 and the first reference value (the memory 312) so that an almost constant light emission quantity is achieved in the individual split light emissions.

In addition, in the fourth embodiment, the photometric counter (the first counter 311) for split light emissions and the photometric counter (the second counter 321) for flash quantity control are provided independently of each other. As a result, since the overall light emission quantity can be ascertained as the accumulated value at the photometric counter for flash quantity control even when an error attributable to the residual light occurs in the light emission quantities corresponding to the individual split light emissions, a high degree of flash control accuracy can be sustained.

Furthermore, since the quantity of light emitted in each split light emission and the light emission temporary halt time are programmable (can be set from the outside) in the fourth embodiment, the flat light emission, which allows the flash discharge tube to be turned on/off repeatedly at high speed, is realized.

What is claimed is:

1. A circuit that digitizes a quantity of light received from a strobe, comprising:
    a photoelectric conversion device that receives light from the strobe and generates an output corresponding to an intensity of the received light;
    a storage device that stores the output generated by said photoelectric conversion device;
    a constant quantity discharge device that holds a storage quantity at said storage device close to a specific value by discharging a constant storage quantity from said storage device over a specific period which is in synchronization with a specific sampling frequency and is shorter than the sampling cycle when the storage quantity at said storage device exceeds a predetermined threshold value and by implementing feedback control on the storage quantity at said storage device; and
    a received light quantity output device that outputs one or more pulse signals when the storage quantity at said storage device exceeds the predetermined threshold value.

2. A circuit that digitizes a quantity of light received from a strobe, comprising:
    a photoelectric conversion device that receives light from the strobe and outputs a current corresponding to an intensity of the received light;
    a current/voltage conversion device that stores the current output by said photoelectric conversion device and converts the current to a voltage value;
    a constant current discharge device that holds the voltage value output by said current/voltage conversion device close to a specific voltage level by discharging a constant current from said current/voltage conversion device over a specific period which is in synchronization with a specific sampling frequency and is shorter than the sampling cycle when the voltage value output by said current/voltage conversion device exceeds a predetermined threshold value and by implementing feedback control on the voltage output by said current/voltage conversion device; and
    a received light quantity output device that outputs one or more pulse signals when the voltage value output by said current/voltage conversion device exceeds the predetermined threshold value.

3. A circuit that digitizes a quantity of light received from a strobe according to claim 2, wherein:
    the constant current is discharged from said current/voltage conversion device over a period corresponding to a half cycle of the sampling cycle.

4. A circuit that digitizes a quantity of light received from a strobe according to claim 2, wherein:
    the constant current changes in correspondence to a camera aperture value and film sensitivity.

5. A circuit that digitizes a quantity of light received from a strobe according to claim 4, wherein:
    the constant current that changes in correspondence to the camera aperture value and the film sensitivity is selected from a plurality of predetermined current values.

6. A circuit that digitizes a quantity of light received from a strobe according to claim 5, wherein:
    the plurality of current values are a plurality of current values inherent to manufactured circuits.

7. A circuit that digitizes a quantity of light received from a strobe according to claim 2, further comprising:
    a device that stabilizes a reverse bias voltage at said photoelectric conversion device; and
    a device that ensures that the threshold value is not affected by a source voltage.

8. A circuit that controls a quantity of light emitted by a strobe, comprising:
    a photoelectric conversion device that receives light from the strobe and outputs a current corresponding to an intensity of the received light;
    a current/voltage conversion device that stores the current output by said photoelectric conversion device and converts the current to a voltage value;
    a constant current discharge device that holds the voltage value output by said current/voltage conversion device close to a specific voltage level by discharging a constant current from said current/voltage conversion device over a specific period which is in synchronization with a specific sampling frequency and is shorter than the sampling cycle when the voltage value output by said current/voltage conversion device exceeds a predetermined threshold value and by implementing feedback control on the voltage output by said current/voltage conversion device;
    a received light quantity output device that outputs one or more pulse signals when the voltage value output by said current/voltage conversion device exceeds the predetermined threshold value; and
    a strobe light emission stop device that counts said one or more pulse signals and outputs a light emission stop signal to the strobe when the count value exceeds a predetermined reference value.

9. A circuit that controls a quantity of light emitted by a strobe according to claim 8, wherein:
    said reference value is set smaller than a design reference value determined by an aperture value and a photographing distance.

10. A circuit that controls a quantity of light emitted by a strobe according to claim 9, wherein:
    said reference value is set so as to gradually change over time after a light emission by the strobe starts.

11. A circuit that controls a quantity of light emitted by a strobe according to claim 8, wherein:
    said strobe light emission stop device counts said one or more pulse signals corresponding to a light emission outputting a very small light quantity implemented by the strobe and selects a constant current for a main light emission following the light emission outputting the very small light quantity from a plurality of predetermined current values based upon results of the count.

12. A circuit that controls a quantity of light emitted by a strobe according to claim 11, wherein:

said plurality of predetermined current values are base 2 exponential values.

13. A circuit that controls a quantity of light emitted by a strobe according to claim 11, further comprising:

a memory storage device that stores differences between said plurality of predetermined current values and a plurality of current values realized in actual circuits in a non-volatile memory; and a correction device that corrects said predetermined reference value based upon the differences between the current values stored at said memory.

14. A circuit that controls a quantity of light emitted by a strobe, comprising:

a photoelectric conversion device that receives light from the strobe and outputs a current corresponding to an intensity of the received light;

a current/voltage conversion device that stores the current output by said photoelectric conversion device and converts the current to a voltage value;

a constant current discharge device that holds the voltage value output by said current/voltage conversion device close to a specific voltage level by discharging a constant current from said current/voltage conversion device when the voltage value output by said current/voltage conversion device exceeds a predetermined threshold value and by implementing feedback control on the voltage output by said current/voltage conversion device;

a pulse signal output device that outputs one or more pulse signals when the constant current is discharged from said current/voltage conversion device; and a split light emission execution device that counts said one or more pulse signals, outputs a light emission temporary halt signal for stopping a strobe light emission over a specific length of time and resets a count value when the count value matches a first value and then repeatedly executes and stops strobe light emission.

15. A circuit that controls a quantity of light emitted by a strobe according to claim 14, wherein:

the constant current discharged by said constant current discharge device is set at a very low current level within a range that allows the voltage value output by said current/voltage conversion device to be held close to the specific voltage level.

16. A circuit that controls a quantity of light emitted by a strobe according to claim 14, further comprising:

a light emission stop device that counts said one or more pulse signals and completely stops a strobe light emission when a count value matches a second value larger than said first value.

17. A circuit that controls a quantity of light emitted by a strobe according to claim 16, wherein:

said first value and a number of repeated light emissions by the strobe are in reverse proportion to each other.

18. A circuit that controls a quantity of light emitted by a strobe according to claim 16, wherein:

said first value is set larger than said second value.

19. A circuit that controls a quantity of light emitted by a strobe according to claim 16, further comprising:

a setting device that estimates a strobe light emission quantity during exposure by performing at least one preliminary light emission on the strobe prior to the exposure and sets said first value, said second value and intervals over which split light emissions are to be performed based upon the estimated strobe light emission quantity.

20. A photoelectric current digitizing circuit, comprising:

a light-receiving element that generates a photoelectric current corresponding to an intensity of received light;

a capacitor connected in series with said light-receiving element, at which an electrical charge is stored by the photoelectric current;

a reference source;

a comparator that compares a voltage at said capacitor and a voltage at said reference source and outputs a first signal when the stored charge is equal to or greater than a specific quantity;

a reference clock generating circuit;

a latch circuit that latches an output of said first signal from said comparator in synchronization with the reference lock;

a gate circuit that outputs one pulse signal in correspondence to one cycle of said reference clock as a digitized photoelectric current signal while said latch circuit is latching the output of said first signal from said comparator, based upon said reference clock and an output from said latch circuit; and a constant current circuit that discharges the charge t said capacitor at a specific current level and implements one discharge in correspondence to one pulse signal output by said gate circuit.

21. An electronic flash unit, comprising:

a light-emitting device;

a light-receiving element that generates a photoelectric current corresponding to an intensity of received light;

a capacitor connected in series with said light-receiving element, at which an electrical charge is stored by the photoelectric current;

a reference source;

a comparator that compares a voltage at said capacitor and a voltage at said reference source and outputs a first signal when the stored charge is equal to or greater than a specific quantity;

a reference clock generating circuit that generates a reference clock;

a latch circuit that latches an output of said first signal from said comparator in synchronization with said reference clock;

a gate circuit that outputs one pulse signal in correspondence to one cycle of said reference clock as a digitized photoelectric current signal while said latch circuit is latching the output of said first signal from said comparator, based upon said reference clock and an output from said latch circuit;

a constant current circuit that discharges the charge at said capacitor at a specific current level and implements one discharge in correspondence to one pulse signal output by said gate circuit;

a counter that counts said pulse signal; and a control device that controls said light-emitting device to start a light emission and controls said light-emitting device to stop the light emission when the count value at said counter exceeds a specific reference value after the light emission starts at said light-emitting device.

22. An electronic flash unit according to claim 21, utilized in a photographing operation performed in a camera, further comprising:
   a constant current value setting device that sets a specific current at said constant current circuit in correspondence to a camera aperture value.

23. An electronic flash unit according to claim 21, further comprising:
   a split light emission device that repeatedly implements and stops light emission at said light-emitting device during a period elapsing after said control device starts a light emission at said light-emitting device until said control device stops the light emission.

* * * * *